United States Patent
Williams et al.

(10) Patent No.: US 10,089,092 B2
(45) Date of Patent: Oct. 2, 2018

(54) CREATING A SOFTWARE PRODUCT FROM A SOFTWARE APPLICATION

(75) Inventors: Wayne D. Williams, Monterey, CA (US); Michael L. Swindell, Aptos, CA (US); James B. Pitts, Toronto (CA)

(73) Assignee: Embarcadero Technologies, Inc., Austin, TX (US)

( * ) Notice: Subject to any disclaimer, the term of this patent is extended or adjusted under 35 U.S.C. 154(b) by 644 days.

(21) Appl. No.: 13/289,972

(22) Filed: Nov. 4, 2011

(65) Prior Publication Data

US 2012/0089971 A1    Apr. 12, 2012

Related U.S. Application Data

(63) Continuation-in-part of application No. 12/695,130, filed on Jan. 27, 2010.

(60) Provisional application No. 61/528,253, filed on Aug. 28, 2011.

(51) Int. Cl.
  *G06F 9/445* (2018.01)
  *G06F 8/61* (2018.01)

(52) U.S. Cl.
  CPC ............ *G06F 8/61* (2013.01); *G06F 9/44505* (2013.01)

(58) Field of Classification Search
  CPC .............. G06F 8/60–8/64; G06F 9/445; G06F 9/44505
  See application file for complete search history.

(56) References Cited

U.S. PATENT DOCUMENTS

| | | |
|---|---|---|
| 6,009,274 A | 12/1999 | Fletcher et al. |
| 6,311,221 B1 | 10/2001 | Raz et al. |
| 6,969,320 B2 * | 11/2005 | Lind et al. ....................... 463/25 |
| 7,131,144 B2 | 10/2006 | Rabin et al. |
| 7,139,978 B2 * | 11/2006 | Rojewski .......... G06F 17/30899 707/E17.119 |
| 7,162,724 B2 | 1/2007 | Blaser et al. |
| 7,451,196 B1 * | 11/2008 | de Vries .................... G06F 8/61 709/220 |
| 7,478,142 B1 | 1/2009 | Veditz et al. |
| 7,690,039 B2 | 3/2010 | Rostcheck et al. |
| 7,735,057 B2 | 6/2010 | Rachman et al. |
| 7,849,016 B2 | 12/2010 | So |
| 8,205,266 B2 | 6/2012 | Pfitzmann et al. |
| 8,230,095 B2 | 7/2012 | Tsui et al. |
| 8,346,897 B2 * | 1/2013 | Jaroker ......................... 717/174 |
| 8,434,093 B2 * | 4/2013 | Larimore et al. ............. 719/312 |

(Continued)

*Primary Examiner* — Emerson Puente
*Assistant Examiner* — Erika Kretzmer

(57) ABSTRACT

A method for creating a product which is a single file executable by a product browser is provided. The method includes: initiating installation operations for application software on a computer system; recording the installation operations of the application software via a product browser, wherein the product browser is configured to create the product and execute the product; and creating the product based on the recording, wherein the creating structures the product with critical dynamic-link library (dll) files that will be pre-fetched by the second instance of the product browser, and wherein the product is structured with a virtualized private registry to be integrated with an operating system registry upon execution such that certain registry keys are virtualized in the virtualized private registry and other registry keys will be deferred to the operating system registry.

20 Claims, 18 Drawing Sheets

(56) References Cited

U.S. PATENT DOCUMENTS

| | | |
|---|---|---|
| 8,464,243 B2 | 6/2013 | Yu et al. |
| 2003/0164850 A1* | 9/2003 | Rojewski .......... G06F 17/30899 715/733 |
| 2003/0182406 A1 | 9/2003 | Dick et al. |
| 2003/0217171 A1 | 11/2003 | Von Stuermer et al. |
| 2003/0233647 A1* | 12/2003 | Blaser ..................... G06F 8/61 717/174 |
| 2004/0045016 A1* | 3/2004 | Romm ............... G06F 9/44505 719/328 |
| 2004/0133803 A1 | 7/2004 | Rabin et al. |
| 2004/0139024 A1 | 7/2004 | So |
| 2004/0230971 A1* | 11/2004 | Rachman ................. G06F 8/67 717/175 |
| 2005/0049973 A1 | 3/2005 | Read et al. |
| 2005/0289050 A1 | 12/2005 | Narayanan et al. |
| 2006/0031547 A1* | 2/2006 | Tsui ..................... G06F 9/4416 709/231 |
| 2006/0041572 A1* | 2/2006 | Maruyama .................. 707/101 |
| 2006/0048136 A1* | 3/2006 | Vries et al. .................. 717/174 |
| 2006/0059253 A1 | 3/2006 | Goodman et al. |
| 2007/0239610 A1 | 10/2007 | Lemelson et al. |
| 2008/0126931 A1* | 5/2008 | Kojima .................. G06F 9/451 715/704 |
| 2008/0215468 A1 | 9/2008 | Monsa-Chermon et al. |
| 2008/0235805 A1 | 9/2008 | Pfitzmann et al. |
| 2008/0294640 A1 | 11/2008 | Yost et al. |
| 2009/0006261 A1 | 1/2009 | Bernstein et al. |
| 2009/0037492 A1 | 2/2009 | Baitalmal et al. |
| 2009/0172658 A1 | 7/2009 | Wood et al. |
| 2009/0217163 A1* | 8/2009 | Jaroker ........................ 717/174 |
| 2010/0037235 A1* | 2/2010 | Larimore et al. ............. 719/312 |
| 2010/0070971 A1 | 3/2010 | Shlomai et al. |
| 2010/0114739 A1 | 5/2010 | Johnston et al. |
| 2010/0281528 A1* | 11/2010 | Hayton .................... G06F 8/60 726/7 |
| 2010/0293622 A1 | 11/2010 | Nikitin et al. |
| 2010/0306187 A1 | 12/2010 | Arrouye et al. |
| 2010/0325434 A1 | 12/2010 | Molaro |
| 2011/0047537 A1 | 2/2011 | Yu et al. |
| 2011/0270833 A1 | 11/2011 | Von Kaenel et al. |
| 2012/0084393 A1* | 4/2012 | Williams .................. G06F 8/61 709/217 |
| 2012/0089485 A1* | 4/2012 | Williams .................. G06F 8/61 705/26.61 |
| 2012/0089971 A1* | 4/2012 | Williams .................. G06F 8/61 717/167 |
| 2013/0121253 A1 | 5/2013 | Wood et al. |
| 2013/0124600 A1* | 5/2013 | Jaroker ........................ 709/202 |
| 2013/0204975 A1 | 8/2013 | Keith |

* cited by examiner

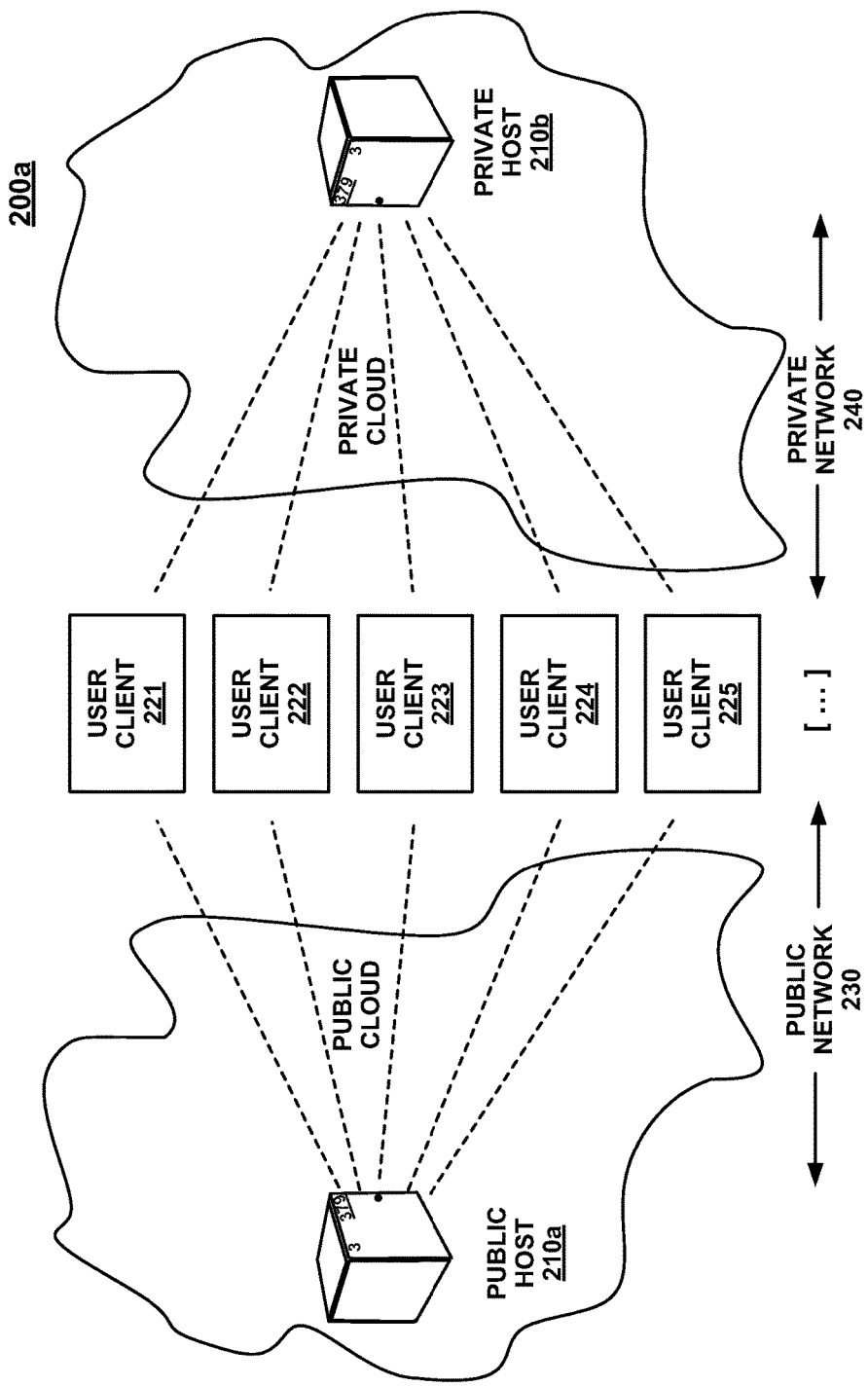

CREATING A SOFTWARE PRODUCT FROM A SOFTWARE APPLICATION

RELATED APPLICATIONS

This application claims priority to the U.S. Provisional Patent Application 61/528,253, entitled "System and Methodology for Automating Delivery, Licensing, and Availability of Software Products" with the filing date of Aug. 28, 2011, by Wayne D. Williams, which is herein incorporated by reference in its entirety.

This application additionally claims priority to and is a continuation-in-part of the copending U.S. Non-Provisional patent application Ser. No. 12/695,130, entitled "System and Methodology for Automating Delivery, Licensing, and Availability of Software Products" with the filing date of Jan. 27, 2010, by Wayne D. Williams, Michael L. Swindell, and James B. Pitt, which is herein incorporated by reference in its entirety.

FIELD OF THE TECHNOLOGY

The present technology relates generally to data processing and computing environments and, more particularly, to system and methods for the delivery, licensing, and availability of application software.

BACKGROUND

Today, online purchase and distribution of software is commonplace. This can be viewed in terms of a purchase-to-usage "chain" that includes different participants: vendors (i.e., ISVs—independent software vendors), purchasers, administrators, and users (e.g., "end users"). The purchase of a particular software package, for example, can be viewed as a process that flows down the chain, from the vendor all the way down to the ultimate end user. The purchase and deployment of software is not a simple linear process, however, but instead includes a number of cycles that occur on an ongoing basis, including installation, provisioning/ configuration, updates/bug fixes, and new products purchases, to name a few. The overall process is made more difficult by PC instability; as more software is installed, a typical PC (personal computer) becomes less stable to operate. If a firm's purchase and use of software were confined to a single product from a single vendor, these ongoing cycles would be more or less manageable by the firm (e.g., corporate IT department). Of course purchasers of software, particularly corporate purchasers, are not confined to using a single software product or even a single vendor. Instead, the norm is to purchase and deploy multiple software packages from multiple vendors, and for each software product one may have purchased and deployed multiple versions. The typical firm must manage hundreds of different combinations of vendors and packages (and often different versions and/or configurations thereof).

This scenario is problematic for software customers, particularly large corporations which must manage an ever-increasing morass of different licensing schemes. Not only must a firm track the licenses for software that it has purchased (e.g., what users go with which licenses, and for which products), but the firm must also contend with disparate licensing schemes; licensing terms are not consistent from one product to another, let alone from one vendor to another. The problem has become increasingly unmanageable and the proliferation of product and devices to run those products continues unabated. Many software customers today are finding that the main cost for software is not its purchase price but the costs of all the management tasks (e.g., installation, provisioning, configuring, updating, license tracking, and so forth) associated with the software. The problem is not confined just to corporate IT departments and their administrators, but extends all the way down to end users who must also contend with a number of issues: how to get a software product on one's machine, how to get updates, how to get new or different product, and so forth and so on.

BRIEF DESCRIPTION OF DRAWINGS

FIG. 2B is a block diagram illustrating configuration of the system of FIG. 2A to support both public (e.g., Internet-based) and private (e.g., LAN-based) environments in accordance with embodiments of the present technology.

DESCRIPTION OF EMBODIMENTS

Glossary

Figure 1:
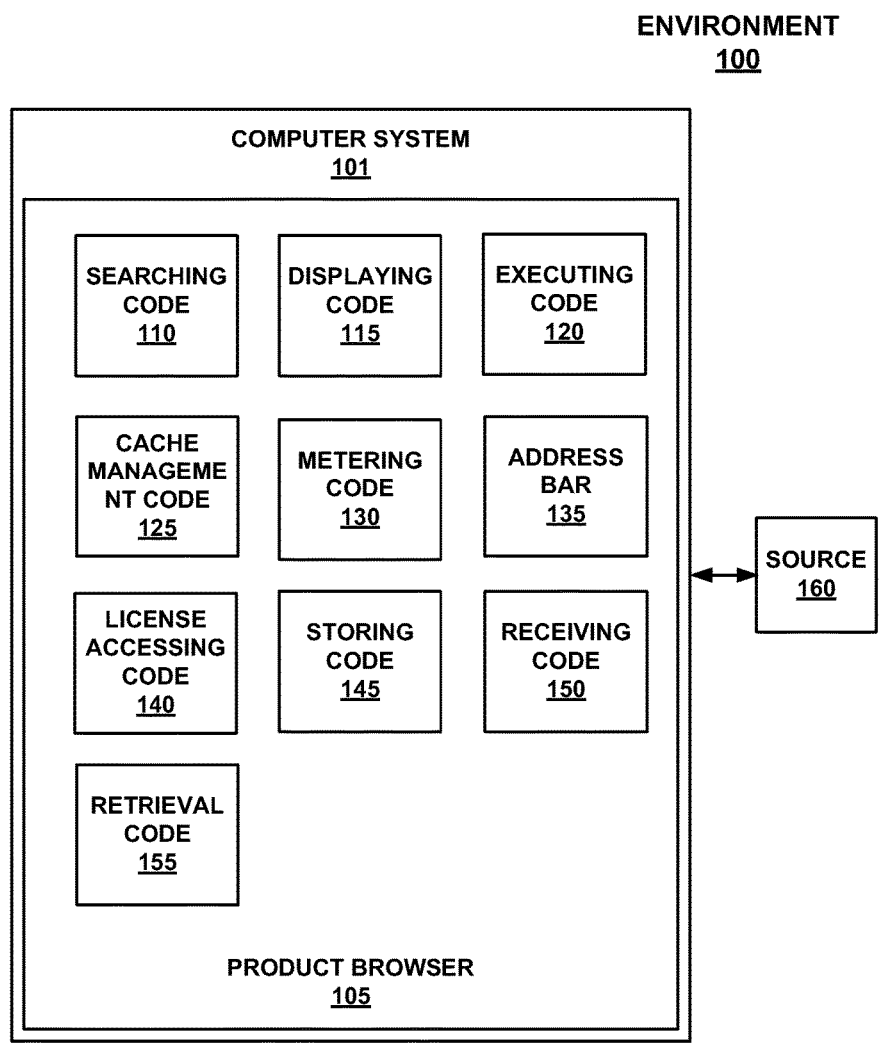
FIG. 1 is a block diagram of a product browser in accordance with embodiments of the present technology.

The following definitions are offered for purposes of illustration, not limitation, in order to assist with understanding the discussion that follows.

LDAP (Lightweight Directory Access Protocol): A well known application protocol for querying and modifying directory services running over TCP/IP.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Package: Refers to a collection comprising one or more software modules, including binary executables (e.g., .exe files, under Microsoft Windows) was well as Java packages (e.g., .jar files), C# packages (e.g., files from .NET framework), and the like.

Relational database: A relational database is a collection of data items organized as a set of formally-described tables from which data can be accessed or reassembled in many different ways without having to reorganize the database tables. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL).

System Administrator: The System Administrator (SA) or simply "administrator" handles tasks that are not specific to applications and works outside the database system's discretionary access control system. System Administrator tasks include: Managing disk storage; Monitoring the database system's automatic recovery procedure; Fine-tuning the database system by changing configurable system parameters; Diagnosing and reporting system problems; Backing up and loading databases; Granting and revoking the System Administrator role; Modifying and dropping server login accounts; Granting permissions to database system users; Creating user databases and granting ownership of them; and Setting up groups which can be used for granting and revoking permissions.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks.

Introduction

Referring to the figures, exemplary embodiments of the technology will now be described. The following description will focus on an embodiment of the present technology, which is implemented in desktop and/or server software (e.g., driver, application, or the like) operating in an Internet-connected environment running under an operating system, such as the Microsoft Windows operating system. The present technology, however, is not limited to any one particular application or any particular environment. Instead, those skilled in the art will find that the system and methods of the present technology may be advantageously embodied on a variety of different platforms, including Macintosh®, Linux®, Solaris®, UNIX®, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present technology may be implemented on a conventional or general-purpose computer system, such as a personal computer (PC) or server computer. A computer system may comprises a central processing unit(s) (CPU) or processor(s) coupled to a random-access memory (RAM), a read-only memory (ROM), a keyboard, a printer, a pointing device, a display or video adapter connected to a display device 105, a removable (mass) storage device (e.g., floppy disk, CD-ROM, CD-R, CD-RW, DVD, or the like), fixed (mass) storage device (e.g., hard disk), a communication (COMM) port(s) or interface(s), a modem, and a network interface card (NIC) or controller (e.g., Ethernet). Additionally, a real time system clock may be included, in a conventional manner.

The CPU comprises a processor which communicates with other components of the system via a bi-directional system bus (including any necessary input/output (I/O) controller circuitry and other "glue" logic). The bus, which includes address lines for addressing system memory, provides data transfer between and among the various components. The random-access memory serves as the working memory for the CPU. In a typical configuration, RAM of one gigabyte or more is employed. More or less memory may be used without departing from the scope of the present technology. The read-only memory (ROM) contains the basic input/output system code (BIOS)—a set of low-level routines in the ROM that application programs and the operating systems can use to interact with the hardware, including reading characters from the keyboard, outputting characters to printers, and so forth.

Mass storage devices provide persistent storage on fixed and removable media, such as magnetic, optical or magnetic-optical storage systems, flash memory, or any other available mass storage technology. The mass storage may be shared on a network, or it may be a dedicated mass storage. The fixed storage stores a body of program and data for directing operation of the computer system, including an operating system, user application programs, driver and other support files, as well as other data files of all sorts. Typically, the fixed storage serves as the main hard disk for the system.

In basic operation, program logic (including that which implements methodology of the present technology described below) is loaded from the removable storage or the fixed storage into the main (RAM) memory, for execution by the CPU. During operation of the program logic, the system accepts user input from a keyboard and pointing device, as well as speech-based input from a voice recognition system (not shown). The keyboard permits selection of application programs, entry of keyboard-based input or data, and selection and manipulation of individual data objects displayed on the screen or display device. Likewise, the pointing device, such as a mouse, track ball, pen device, or the like, permits selection and manipulation of objects on the display device. In this manner, these input devices support manual user input for any process running on the system.

The computer system displays text and/or graphic images and other data on the display device. The video adapter, which is interposed between the display and the system's bus, drives the display device. The video adapter, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system, may be obtained from the printer, or other output device.

The system itself communicates with other devices (e.g., other computers) via the network interface card (NIC) connected to a network (e.g., Ethernet network, Bluetooth wireless network, or the like), and/or modem (e.g., 56K baud, ISDN, DSL, or cable modem). The system 100 may also communicate with local occasionally-connected devices (e.g., serial cable-linked devices) via the communication (COMM) interface, which may include a RS-232 serial port, a Universal Serial Bus (USB) interface, or the like. Devices that will be commonly connected locally to the interface include laptop computers, handheld organizers, digital cameras, and the like.

A software system is typically provided for controlling the operation of the computer system. The software system, which is usually stored in system memory (RAM) and on fixed storage (e.g., hard disk), includes a kernel or operating system (OS) which manages low-level aspects of computer operation, including managing execution of processes, memory allocation, file input and output (I/O), and device I/O. The OS can be provided by a conventional operating system, Microsoft® Windows NT, Microsoft® Windows 2000, Microsoft® Windows XP, Microsoft® Windows Vista, or Microsoft® Windows 7 (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system. The application(s) or other software intended for use on the computer system may be "loaded" into memory from fixed storage or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying computer components that may be employed for implementing the present technology. For purposes of discussion, the following description will present examples in which it will be assumed that there exists a "server" (e.g., primary server providing core services) that communicates with one or more "client" (e.g., a "user client" operating from a desktop computers). The present technology, however, is not limited to any particular environment or device configuration. In particular, a client/server-based distinction is not necessary to the technology, but is used to provide a framework for discussion. Instead, the present technology may be implemented in any type of system architecture or processing environment capable of supporting the methodologies of the present technology presented in detail below.

Exemplary Platform

Overview

In accordance with the present technology, an end-to-end system (commercially embodied as in All-Access™ and ToolCloud™ products/services) is provided for automating the delivery, licensing, and availability of application software. The system represents the first solution that ties all of these actions together into a single system, which extends all the way from the vendor, to the administrator, and then to the user, all in a fluid delivery cycle that operates on demand. At its core, the system is implemented as a set of services that facilitate delivery, licensing, and availability of software, and also supports on-demand virtualization of software with automated license activation (as described in further detail below).

In an embodiment, the system employs client/server architecture. A "user client" module or "ToolBox" is installed at each user's machine and provides a console or "dashboard" that communicates with a host cloud server (ToolCloud™ server), thus forming a closed loop system within which the entire lifecycle is managed. For example, when a new software package is available, the client (user) immediately sees it as the server alerts the client. In a similar fashion, when an update is available, it is immediately available to the client (which can then proceed to download the update in the background). Thus in this manner, a multitude of software packages may be placed on the server and be made immediately available to the client. The client in turn may download and install any of the available software packages, or alternatively execute software packages using on-demand virtualization with automated license activation.

It should be appreciated that the term product browser refers to a software application, software module, or code for a client application designed to execute on a computer system or other device. The product browser is capable of installing, executing, caching, managing, and searching for, a product or products as well as other operations in regard to a product. The product browser may be Embarcadero Technologies' ToolBox, AppWave or AppWave browser.

The term product refers to a software application such as a native executable application or a self-contained filed that is resolvable by the product browser and that is managed, executed, installed, and otherwise operated upon by the product browser. The product may be referred to as an app.

System Components

FIG. 1 is a block diagram illustrating environment 100 which is an example environment comprising computer system 101 and product browser 105 in accordance with embodiments of the present technology. Environment 100 depicts computer system 101 as a hardware computer system for carrying out the present technology. Product browser 105 is depicted as comprising various components that may or may not be implemented in an embodiment of the present technology.

In one embodiment, computer system 101, or another device, comprises a computer usable storage medium having computer readable program code embedded therein for a product browser such as product browser 105. In one embodiment, product browser 105 has a user interface at computer system 101 configured for receiving a user selection of a product from source 160. Source 160 may comprise a plurality of products, for execution at computer system 101. Source 160 may be a database located on hardware that is either privately or publicly accessible. For example, source 160 may be a private database that is owned by an enterprise and only accessible by authorized product browsers. Product browser 105 may be able to access more than one sources or databases. In one embodiment, the product is a self-contained file resolvable by the product browser. Product browser 105 may comprise a preloaded product for executing within an operating system associated with the device. Product browser 105 may be configured to receive a pushed product pushed from the source.

In one embodiment, computer system 101 has an operating system that comprising a registry and a file system that compatible with product browser 105. For example, a Windows operating system may have a registry and file system.

Product browser 105 may comprise searching code 110 for discovering the product at source 160 based on metadata associated with the product. Discovering or searching for the product via the product browser 105 is responsive to a user input at the product browser. For example, the product may comprise metadata that including, but not limited to, descriptions, support contacts, screenshots, icons, version, edition, web site, system requirements, release date, language type, socialization data, user ratings and reviews, etc. The metadata may be employed in a search for a product. A user may enter a key word search into product browser 105 and product browser 105 will then discover products containing the key words in the product's metadata.

Product browser 105 may comprise displaying code 115 for displaying information related to the product at the device via the product browser. The information may be information found in the metadata associated with the product. Displaying code 115 may display the information in the user interface associated with product browser 105.

Product browser 105 may comprise executing code 120 for executing the product at the device via the product browser in response to a command from a user. Executing code 120 may execute the product without requiring installation of the product in an operating system associated with computer system 101. This may be accomplished by using a cache to isolate the product from the operating system. In one embodiment, executing code 120 executes the product using a cache on a storage medium associated with the computer system 101. Such caching may be referred to sandboxing the product.

In one embodiment, the cache associated with computer system 101 is managed using cache management code 125. Cache management code 125 is capable of automatically managing a size of the cache on the storage medium. For example, a user or a program may select limit on the size of the cache. Cache management code 125 will ensure that the limit is not exceeded. Cache management code 125 can also auto grow the size of the cache in response to pre-selected limits or based on the addition of more products to computer system 101 via product browser 105. In one embodiment, cache management code 125 is capable of removing or deleting a product once a limit of the cache has been reached a new product is desired to be added to the cache.

Product browser 105 may comprise metering code 130 for tracking a usage of the product via the product browser. A usage may be how often or for how long a product is executed at computer system 101. For example, metering code 130 may monitor that a particular app has only been executed once at computer system 101 after it was initially installed or cached at computer system 101. Metering code 130 may generate reports based on the usage. Therefore, metering code 130 may provide information that is useful in making decisions about whether a product should remain installed or cached on a given computer system. This is particularly important in a situation where the product is licensed to a limited number of installations. In one embodiment, metering code 130 may operate to prevent the product from executing in response to a license cap being exceeded.

In one embodiment, product browser 105 comprises address bar 135 for displaying a uniform resource locator associated with the product. The uniform resource locator (URL) can be copied and disseminated to another location. For example, a user may wish to inform another user of a given product. The user may copy the URL and send it to the other user. The other user may then paste or enter the URL into their own product browser to locate the product for installation, caching, executing, etc. Thus, a user can easily share information regarding a product with another user. The URL may also be placed on websites or other documentation. Address bar 135 can also be employed for receiving key words from a user for performing a search of available products. Displaying code 115 may employ the URL for displaying information related to the product accessing the information from source 160 via the URL.

Product browser 105 may also be employed to automatically manage a license associated with the product. The product may be licensed software that requires authorization to install or execute. Such authorization may come in a variety of forms such as a license key, product key, or serial key. Such authorization is not limited to a key. An enterprise or other organization may have only a limited number of licenses that allow only a limited number of instances of the product to be installed or executed by devices owned and operated by the enterprise. Additionally, managing the actual authorization for each instance of the product may be tedious or difficult to effectively maintain. Some user may also under-utilize a product installed or cached on their device and thus deprive another user that ability to use the license for the product.

Product browser 105 solves these problems by automatically managing a license associated with the product. In one embodiment, license accessing code 140 places the proper authorization, such as a key, in the appropriate file or registry location as associated with the operating system of computer system 101. The appropriate file or registry location is defined by the product. Product browser 105 then manages the license such that the product will activate the license when the user executes the product. Therefore the product will start licensed without requesting licensing input from the user. License accessing code 140 automatically accessing the license for the product from a database of licenses. The database of licenses may be associated with source 160 or a different source. Storing code 145 then stores the license for automatic license activation upon execution of the product. Such storage may take place on a storage medium associated with computer system 101.

Product browser 105 may operate such that a user can discover a product and select the product for executing. The product may then be streamed from source 160 and may be executed at computer system 101 by product browser 105 before the product is done streaming. In one embodiment, product browser 105 comprising receiving code 150 for receiving an execution command from the user for the product as well as retrieval code 155 for initiating a streaming retrieval of the product from a source. Executing code 120 then executes the product via the product browser during the streaming before the streaming is complete. Retrieval code 155 may operate to pre-fetch core pieces of the product from source 160 needed for executing at computer system 101. For example, a critical dynamic-link library (dll) associated with the product may be pre-fetched for streaming by retrieval code 155 before other components or elements of the product are streamed to product browser 105. Retrieval code 155 may also operate to demand a component or element of the product during the streaming. Such a demand may become necessary based on a required functionality of the product during execution. For example, a user may require a certain functionality of the product that requires components or elements of the product that have not yet been streamed to product browser 105.

Figure 2A:
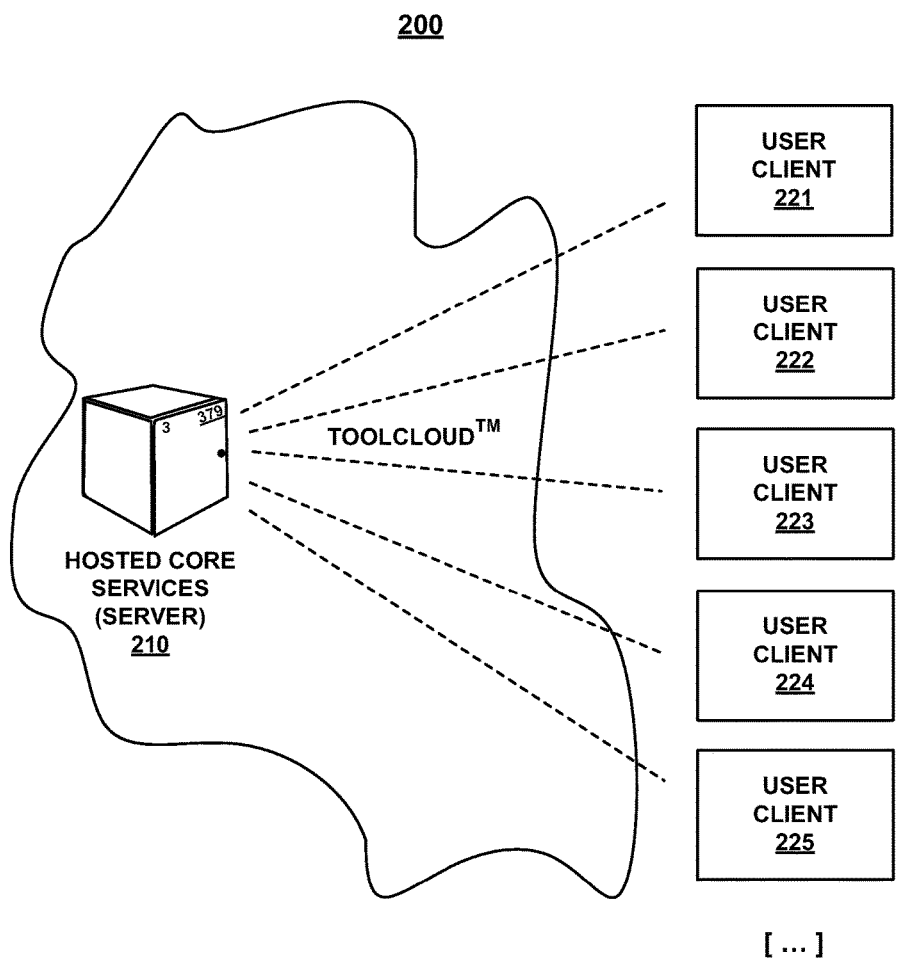
FIG. 2A is a block diagram illustrating the basic components that comprise the end-to-end lifecycle management system in accordance with embodiments of the present technology.

FIG. 2A is a block diagram illustrating the basic components that comprise the ToolCloud™ software lifecycle management system of the present technology. As shown, system 200 includes a plurality of user clients or product browsers, such as user clients 221-225, that connect to a host system ("cloud server") 210 which provides a ToolCloud™ (i.e., cloud server hosted) environment. In one embodiment, the product browser is ToolBox. Each user client connects to the host system 210 on a one-to-one basis; for example, user client 221 connects to host system 210 on a one-to-one basis for managing the specific software package(s) that user client 221 has licensed, including downloading, installing, licensing, running, and maintaining specific software on a one-to-one basis.

The ToolCloud™ environment itself may be run with both public and private cloud components. FIG. 2B illustrates the system 200 (now 200a) configured in this manner. The public environment represents a publicly-accessible solution available via a public network. As shown, system 200a includes the plurality of user clients 221-225 connecting to a public cloud, that is, connecting to a host system (server) 210a via a public network 230, such as the Internet. Additionally, the user clients 221-225 connect to a private cloud, specifically, the private host system (server) 210b accessible via a private network 240, such as a corporate LAN (local area network). Although the figure illustrates a simplified embodiment having two clouds (i.e., one public and one private), the present technology is not limited in this fashion; instead, a plurality of clouds may be supported. In a typical deployment, the system will include one public cloud and multiple private clouds.

Each private cloud represents a local server deployment inside an organization, for example, placing the host server 210 on site (e.g., as private host 210b), with local administration, for servicing internal clients. In this manner, each private cloud is well-positioned to furnish a firm's users with managed access to all the software that the firm has licensed. Each private cloud includes an application cache that is loaded from media and/or other clouds. Typically, a given private cloud pulls applications into its application cache from the public cloud (e.g., via HTTP communication protocol), thereby allowing the private cloud to offer an up-to-date catalog of applications.

Figure 2C:
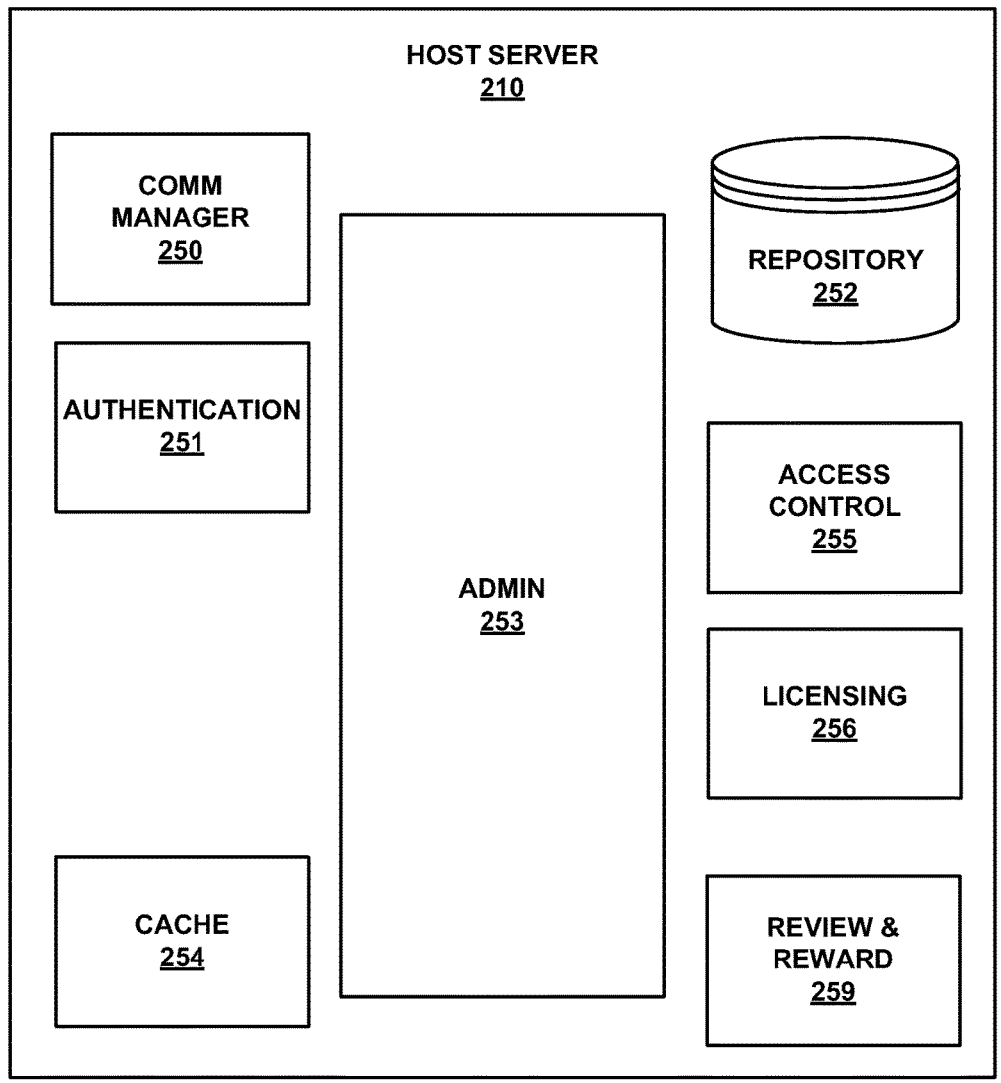
FIG. 2C is a block diagram illustrating the host server presented in FIG. 2B in further detail in accordance with embodiments of the present technology.

FIG. 2C is a block diagram illustrating the host server 210 in further detail. As shown, the server 210 includes the following modules: a communication (comm) manager or module 250, authentication module 251, repository 252, administration (admin)/configuration module 253, cache module 254, access control manager or module 255, licensing module 256, and review and reward module 259. Each of these will be described in further detail.

The communication manager 250 engages in communication with clients and other servers, via communication traffic on one or more preconfigured ports. The communications manager 250 works in conjunction with the authentication module 251, which authenticates clients wishing to connect to the host server 210. Repository 252 is used as a storage mechanism to store persistent data, including software product information such as versions, updates, configurations, and licensing information. In an embodiment, the repository 252 is implemented using an embedded SQL relational database.

The cache module 254 is a file-based storage for caching products locally (i.e., increases speed of retrieval) and includes versioning features for tracking disparate copies of each product cached. Each software product is made available via a network share that authorized product browsers can access. Software products can also be made available by streaming binaries over hypertext transfer protocol (HTTP) from ToolCloud to the product browser. Additionally, the software products can be can be copied into the product browser or installed via HTTP. From the network share, a given Product browser may launch an application directly (if the application is set up for instant-on access, described below) or copy (download) the application to the Product browser's local library. Each software product can have multiple versions, and each version in turn can have multiple possible configurations. Thus, each "flavor" (i.e., specific version and specific configuration) of a product can have its own unique "binary" (i.e., binary image on disk). The cache module 254 keeps track of these different binaries.

Access to individual products (i.e., what products are made available to a given product browser) is controlled by the access control manager 255. User credentials are automatically resolved against available licenses. The particular licensing terms that a given product is available under is tracked by the licensing module 256. The module provides a means by which each cloud server can marshal out licensing terms to individual clients (product browsers) and captures usage statistics based on the licensing. This can be done automatically and transparently, thus freeing individual users from the task of license management. Review and reward module 259 captures user reviews of products. The module includes a reward component to give recognition to users under appropriate circumstances, such as rewarding users who provide reviews or upload useful configurations.

Overall administration of the system 210 is controlled via administration (admin)/configuration module 253. The module includes a user interface allowing the system administrator to specify configurations, including a permission model that establishes access rights for users. The administrator can create different client (product browser) configurations and assign each to a particular group of users. Additionally, the administrator uses the interface to load the various software products that will be offered by the system, and enter relevant licensing information for each such product.

"ToolBox" User Interface (UI) Walk-Through

Figure 3A:
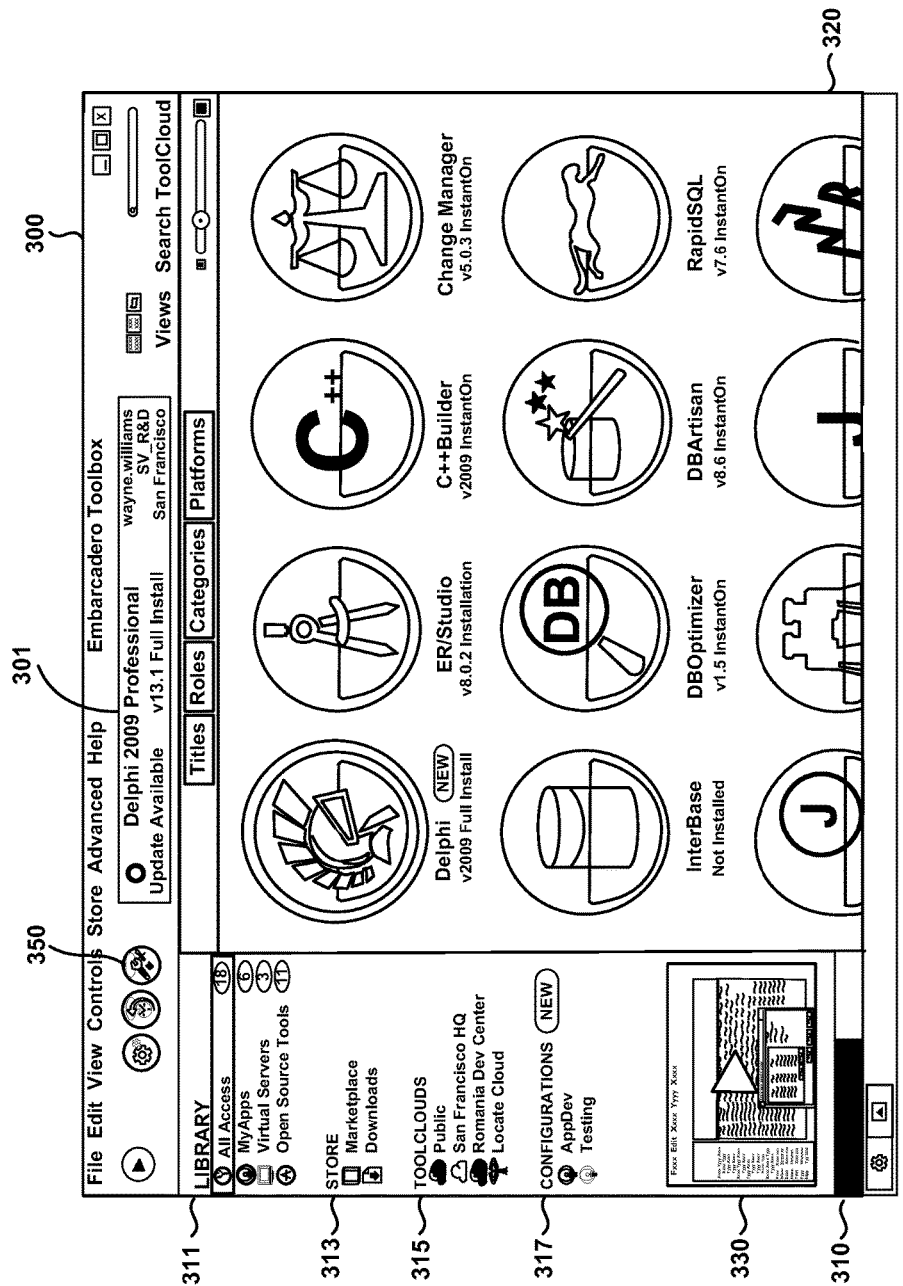
FIG. 3A is a screenshot illustrating a user interface for the ToolBox (i.e., UI for the user client portion of the system) in accordance with embodiments of the present technology.

FIG. 3A is a bitmap screenshot illustrating an embodiment of user interface 300 for the "ToolBox," which serves as the UI for the user client. The typical usage case for a given user is as follows. Upon receiving access rights to software (e.g., from purchase of a software package), the user receives an e-mail with a web link providing access to an installable copy of the ToolBox. Then, the user downloads and installs the ToolBox, thus bootstrapping the entire software acquisition process. Typically, no physical media or product delivery is required. In a private ToolCloud™ system deployment inside an organization, the organization's system administrator will grant (appropriate) users access to certain software packages, whereupon an e-mail invitation is automatically generated and sent out to those users. Each e-mail includes a link to provision a ToolBox client for each user added to the system. The ToolBox, in turn, is the mechanism that users employ to obtain software product.

As shown in the figure, the ToolBox UI 300 includes a status pane 301 and a navigation panel 310. The status pane 301 displays the current system status, including information about who the user is currently logged in as (i.e., what username), what group the user belongs to, and what cloud(s) the user is connected to, as well as information about the currently selected application in the ToolBox's workspace (i.e., the product that the user has selected the corresponding thumbnail for).

The panel 310 on the other hand provides navigation features and contains the following items: Library 311, Store 313, "Toolclouds" 315, and Configurations 317. The functionality of each item is perhaps best described by examining use cases. After installing the ToolBox, the user first connects to one or more "clouds" and then "charges" the ToolBox. "Toolclouds" panel item 315 allows the user to indicate which cloud environment(s) (e.g., public "cloud" or private "cloud") to connect to. The UI 300 includes a "Locate Cloud" feature that allows the user to search for different environments to connect to. Typically, the user connects to a public cloud and one or more private clouds within the user's organization.

After successful connection to at least one cloud, the user still has an "empty" ToolBox. Thus, the user now proceeds to "charge" the Tool Box, that is, fill it with software applications required by the user. Based on the credentials presented by the user, the currently-connected cloud server allows the user to charge the user's ToolBox with products and packages. Note that these credentials are automatically resolved against the available licenses, for the items that the user wishes to obtain. (The user may charge from available public and private clouds.) Each individual cloud presents items available to the given user. The user may select all available products, or pick and choose as appropriate. Once the user has completed selection, the (respective) cloud server begins streaming these products to the user's ToolBox. Once the user has charged the ToolBox, the products (e.g., application software) are displayed as available items in the ToolBox workspace 320. Now, a multitude of products (e.g., Delphi®, InterBase®, RapidSQL™, etc.) are available to the user, as shown in FIG. 3A. Each product is made available with its respective installer, so that the user can easily install the product by selecting the product icon from the workspace and launching the product's installer (by clicking Setup/Install button 350).

Each software application is made available as a special "Tool Cloud Application" (TCA). A TCA is a managed application that runs within a public or private tool cloud (including local ToolBoxes). It represents a component web application server or desktop application that fully exploits the services provided by the cloud server, including participating with the licensing services of the cloud server so as to provide activation enablement coupled with immediately available execution. The TCA is built by enabling an existing application or is built from scratch. TCAs allow the user to download and install a given software product (i.e., conventional installation) or instead run the software product instantly, by invoking an "Instant On" feature of the present technology. Instant-on access allows users to run software products without the friction or burden of installation.

The user interface for instant-on usage in an embodiment is as follows. With the desired product selected (e.g., Delphi® is selected in the workspace 320, as indicated by highlight), the user clicks the Instant On glyph 330, whereupon the system runs the application (i.e., the full, rich application) without performing a full install of the product on the user's machine. Here, the system streams an executable version of the actual product to the user's machine (if not already streamed), and immediately launches its execution. The system of the present technology provides special packaging in the form of an executable archive that includes license management and related metadata, together with a virtualized file system and registry, that allows application software products to be streamed from the cloud server to the client for immediate execution (i.e., without waiting for installation at the client). In an embodiment, the application binary (e.g., ultimately deployed .exe file) is pre-imaged (i.e., previously capture to disk) at the server and can therefore be streamed on-demand to the client for immediate execution. Additional efficiencies are achieved by virtue of the fact that only the application components (e.g., DLLs) necessary for execution are streamed to the client (in contrast to a traditional application, where many or most of the application's components must be unpacked at the local system for installation and execution).

Conventional virtualization technique can be employed to virtualize the file system and the registry used by the instant-on (streamed) application; the application binary itself executes natively (i.e., without virtualization). During execution of the instant-on application binary, the virtualized local file system supports creation of local objects, data structure, and files (e.g., DLLs), and any other items that the application expects (i.e., the virtualized execution environment is preconceived). This serves as a local sandbox for the instant-on application to write local data, including for instance configuration information. In this manner, the instant-on application is executed in a self-contained environment so that its impact on the user's computer can be minimized.

Registry settings are handled as follows. Applications not only expect to find a system registry (e.g., Microsoft Windows registry) but also expect to read and write to the registry during program operation. Here, the system of the present technology provides every application with its own virtualized private registry, which is integrated with the (real) operating system (e.g., Windows) registry. The integration is such that certain registry keys (i.e., data values) are virtualized, while others are simply deferred to the real registry. When a registry call is made for a particular registry key by an instant-on application, the virtualized registry is employed if the particular registry key itself has been virtualized. Otherwise, the call is simply passed through to the operating system (OS) and hence the OS registry. In a similar fashion decisions are made regarding the virtualized file system versus the real (operating system) file system. Consider, for example, instant-on use of an application offered by a cloud's library, such as Embarcadero Technologies' Delphi® (development tool), Microsoft® Word (word processor), or Adobe® Photoshop (bitmap and photo editor). In each case, the end user's normal use of the instant-on application results in the creation of user documents (e.g., Delphi® source code file, Word document file, or Photoshop document file). These are saved to the real file system. Changes to the application itself that are stored to the file system (e.g., non-registry configuration information), on the other hand, are saved to the virtual file system.

Each instant-on application can be maintained on the user's computer as a cached application, or it may be deleted and streamed at a future date. Applications that are in the user's cache of applications are listed under Library 311. Whereas each cloud represents software applications that are available, the Library represents applications that the user has placed in the ToolBox. For the example shown in the figure, the user has 18 local applications under All Access (licensed under a single "All Access" pass), and 6 applications under MyApps (e.g., internal applications or third-party applications). In a manner similar to virtualization of software applications, servers (e.g., MySQL server) can be virtualized and made available under Library 311 as a "virtual server" (i.e., a virtual instance of a server). This is especially useful for those users who are developers. For example, consider a developer user who is developing a product against five databases. Using the system of the present technology, an administrator need only create five different virtualized versions of those databases and then make those available to the firm's developer users.

Figure 3B:
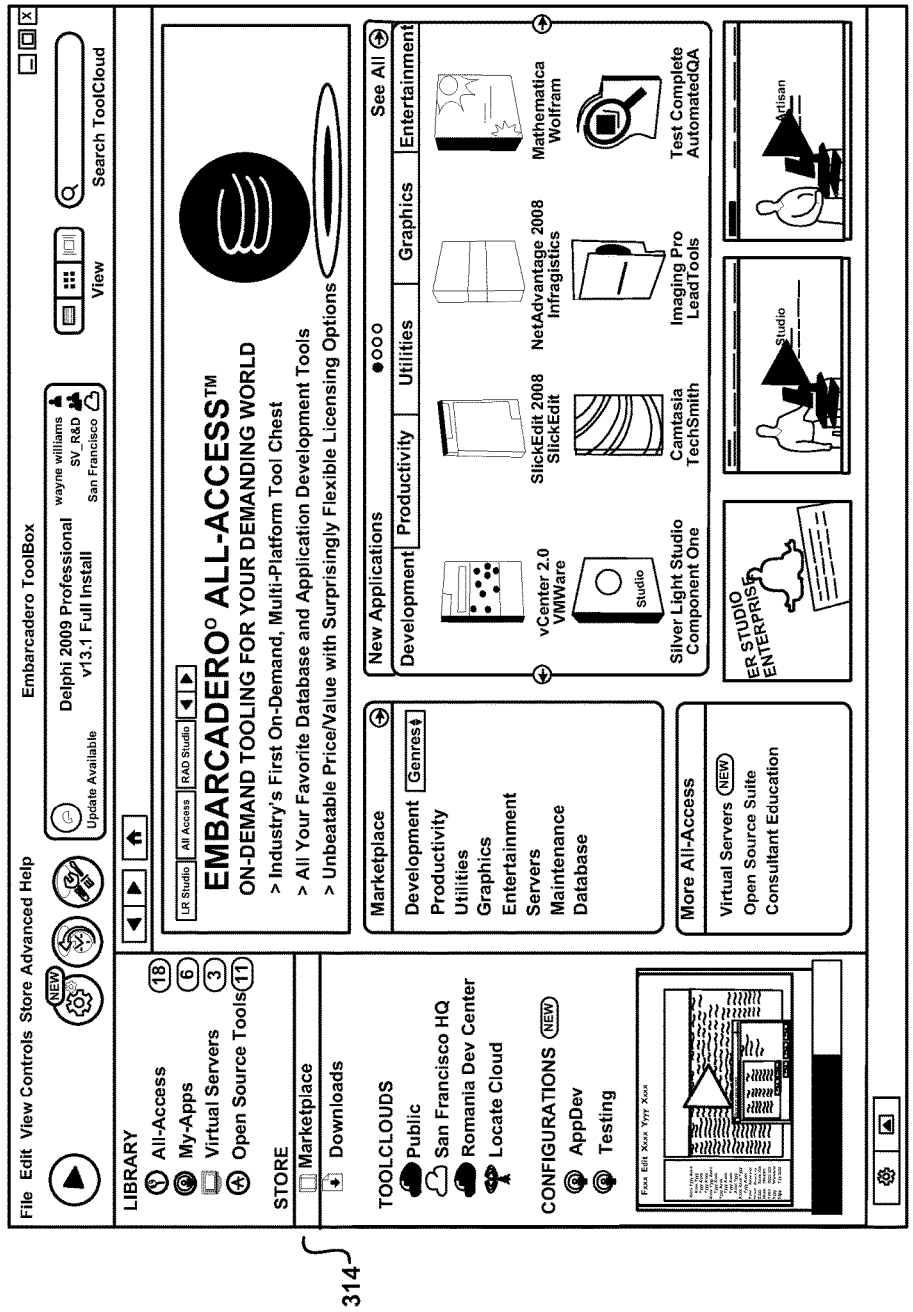
FIG. 3B is a screenshot illustrating selection of a "Marketplace" within a "Store" hosted by the ToolBox in accordance with embodiments of the present technology.

Each cloud represents a collection of things that are licensed or built (e.g., by a corporation or firm). Apart from "cloud" products (i.e., already licensed products), the navigation panel 310 includes a "store" (Store 313) where one can acquire new software or other products. FIG. 3B is a bitmap screenshot illustrating selection of "Marketplace" (314) within the Store 313. As shown, the workspace of the user interface lists items available for purchase in the public marketplace (public cloud), thus serving as a gateway to products not currently within one of the other clouds. Purchased items can be either placed directly into the user's Library or into a cloud (e.g., firm's private tool cloud, managed by the firm's administrator and/or users).

The system of the present technology facilitates configuration management by allowing the administrator to create different ToolBox configurations and assign each to a particular group of users. For example under Configurations 317 in FIG. 3A, the system administrator has created an AppDev configuration (e.g., for the firm's application developer users) and a Testing configuration. This allows the administrator to configure the interface so that testers (testing employees) only see testing tools. In this manner, the administrator can control which users see particular applications offered as available from the clouds. Similarly, Configurations 317 can be used to create different application environment configurations. For example, an administrator may create and manage various Eclipse™ configurations (Team 1 configuration, Team 2 configuration, etc.), for various teams that an organization may have. One of the configurations, for instance, may be "locked down" to prevent user changes to the configuration.

Figure 3C:
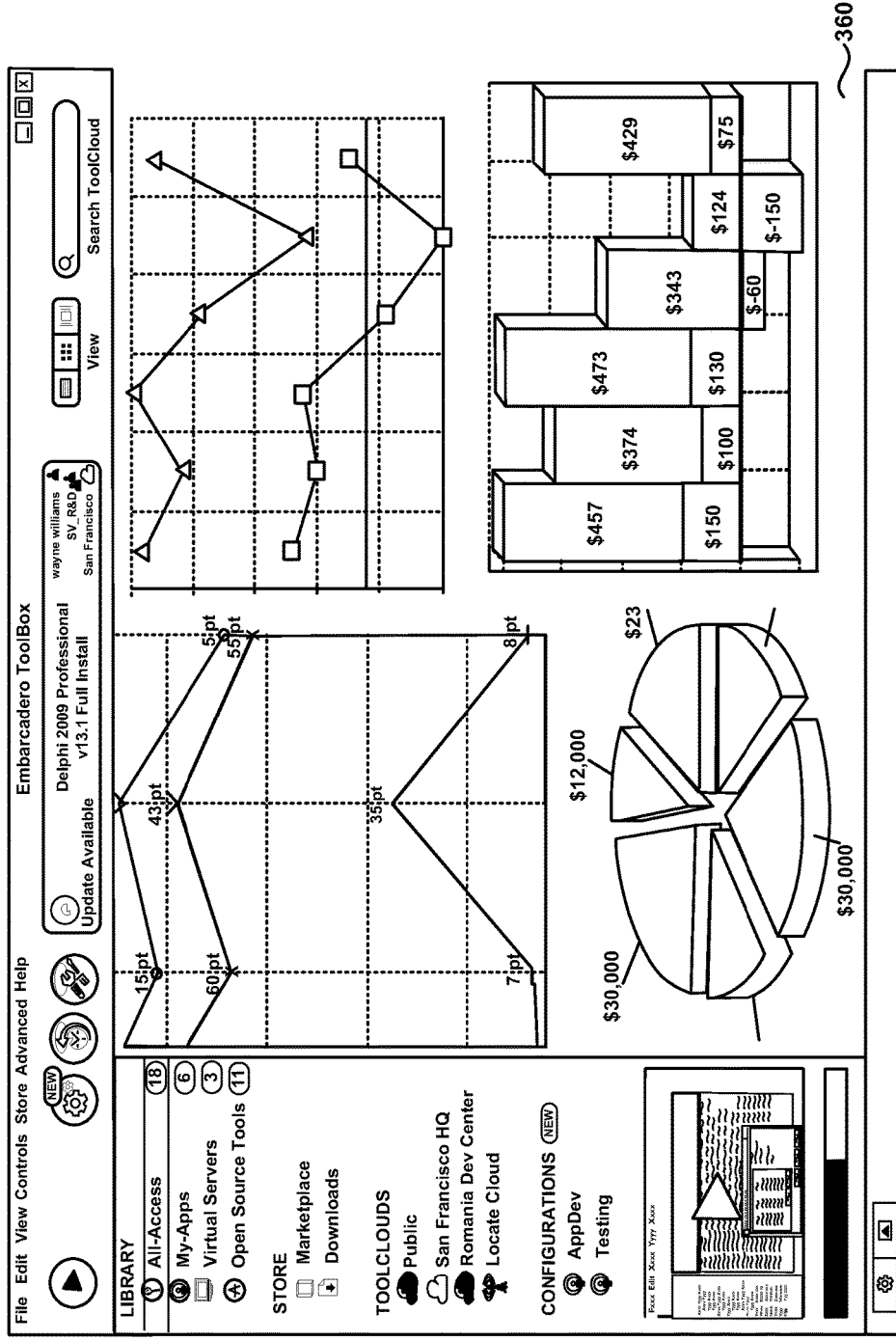
FIG. 3C is a screenshot illustrating a report workspace provided by the system for real-time license tracking and usage reports in accordance with embodiments of the present technology.

The centralized management of applications provided by the system of the present technology enables real-time tracking of licenses and usage. FIG. 3C is a bitmap screenshot illustrating a report workspace 360 provided by the system for real-time license tracking and usage reports. These reports reflect transactions that are happening in the background against each cloud server.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). For purposes of the following discussion, it is assumed that the system (i.e., system 200) has already been deployed, so that the ToolBox (client agent) is installed at the user's machine and at least one cloud server is online and available for providing services to that ToolBox. As previously described, the system may send a given user an e-mail invitation to download and install the ToolBox (from a web link embedded in the e-mail). Exemplary methods of operation are as follows.

A. Software Procurement (1) General Process

Figure 4:
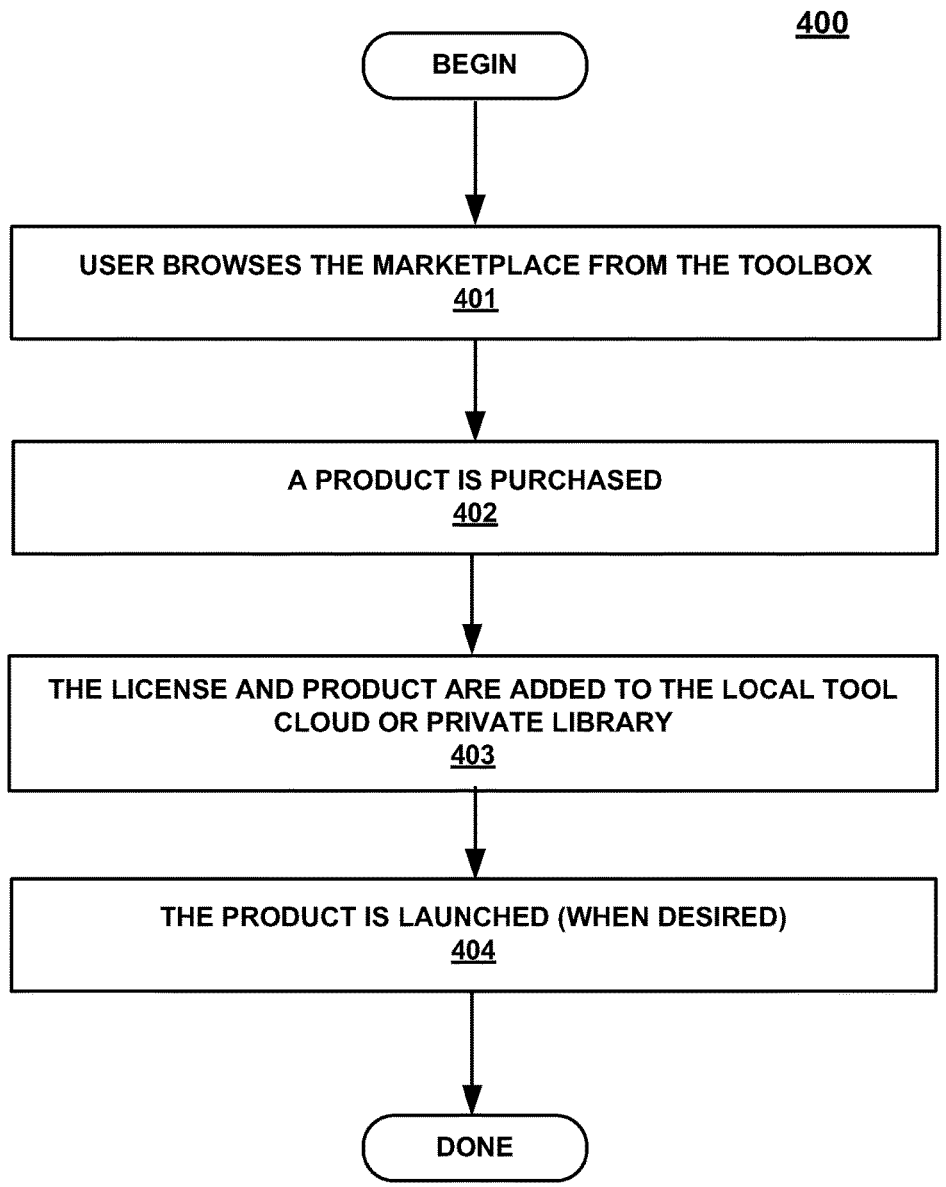
FIG. 4 is a high-level flow diagram illustrating a method for procuring applications, for example by purchasing applications from the public cloud ("Marketplace") in accordance with embodiments of the present technology.

FIG. 4 is a high-level block flow diagram illustrating a method 400 of the present technology for procuring applications, for example by purchasing applications from the public cloud or "Marketplace." At step 401, a user (i.e., end user) can browse the store from within the product browser; filtering by criteria (e.g., vendor, product, category, etc.) is available. A product can be purchased with the user's account at 402, performed using conventional e-commerce/shopping cart technology, with the download being managed by the product browser. Depending on the license selection, the product is downloaded to the product browser or to the local tool cloud. In the case of network named user licensing and concurrent licensing the download is to the tool cloud, which manages concurrent usage/provisioning. In the case of per seat or node-locked license, the download is to the product browser. In both cases the license (slip file) is retrieved from the store and configured automatically at 403. The software product is launched on-demand, as indicated at step 404.

(2) Internal Operation

Figure 5A:
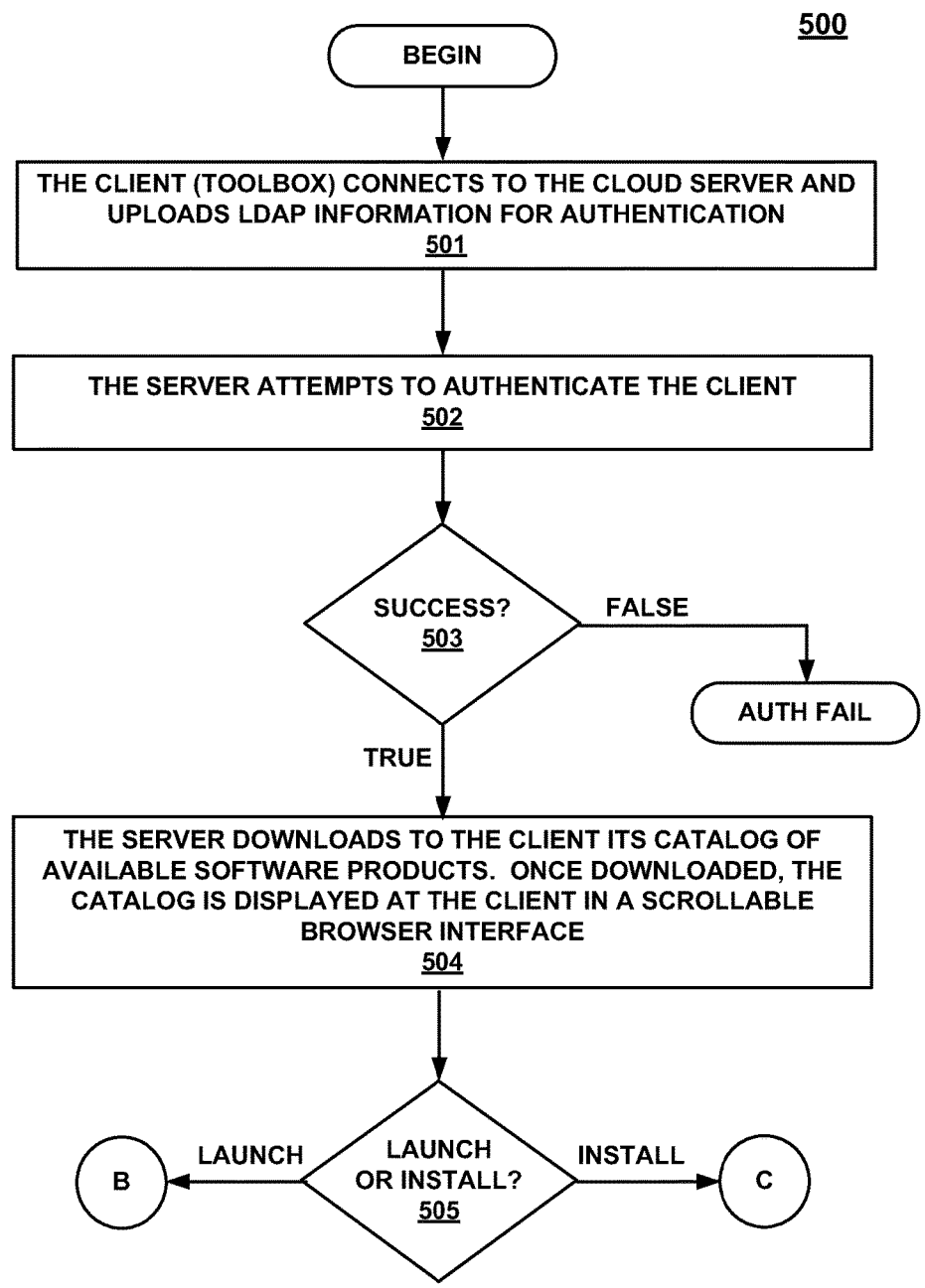
FIGS. 5A-C comprise a detailed flow diagram illustrating a method for automating the delivery, licensing, and availability of application software in accordance with embodiments of the present technology.
Figure 5B:
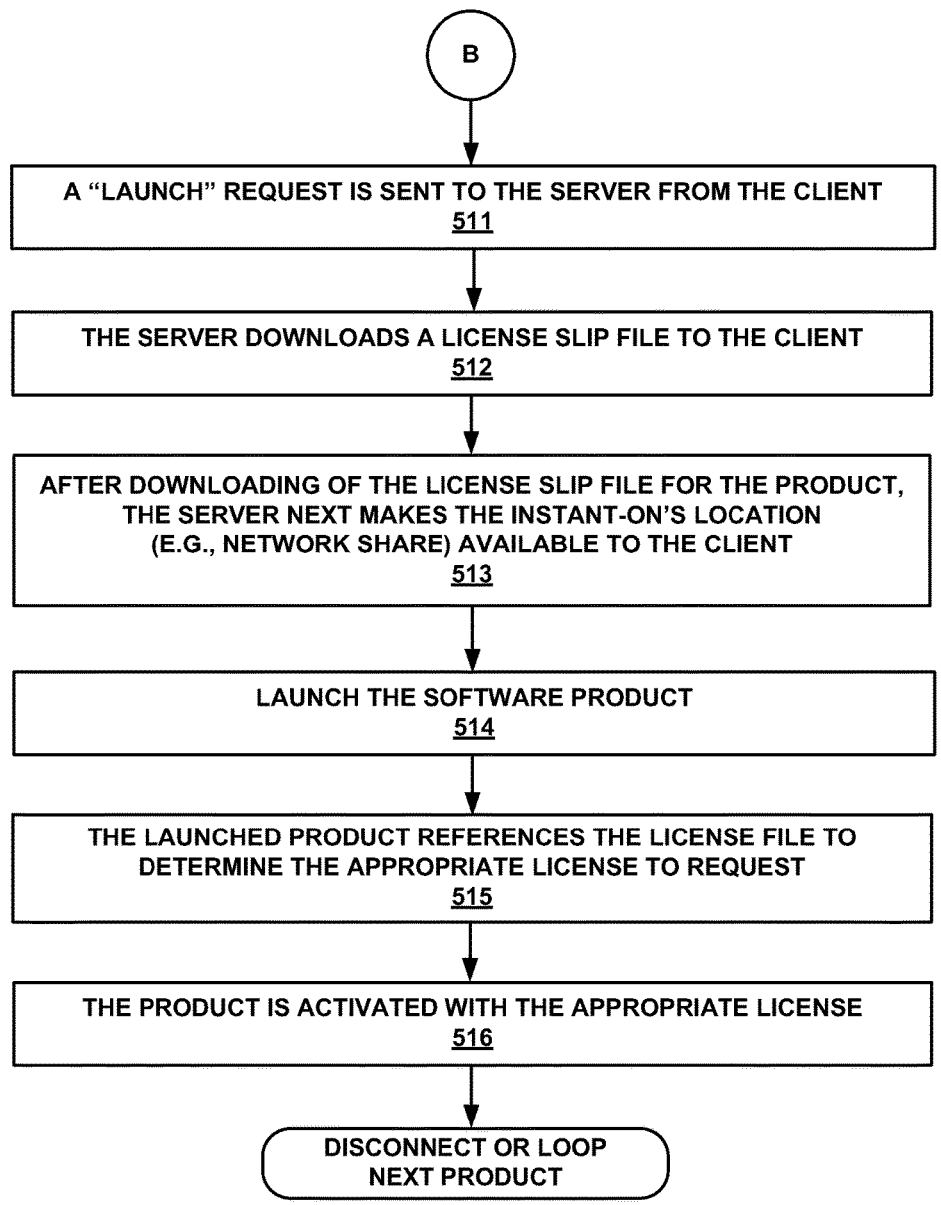
Figure 5C:
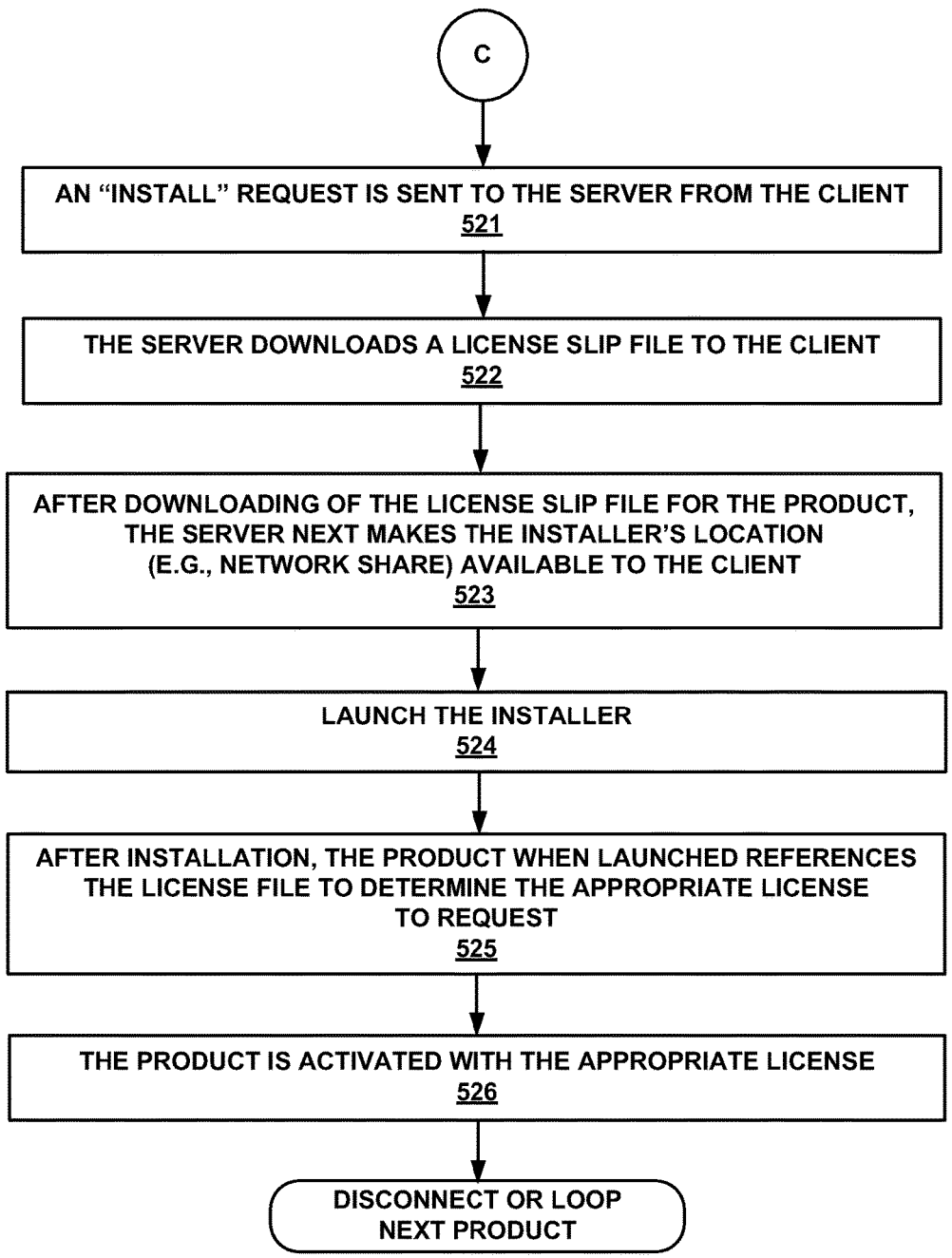

FIGS. 5A-C comprise a detailed flow diagram illustrating a method 500 for automating the delivery, licensing, and availability of application software. The method steps are as follows. At step 501, the client or product browser (i.e., ToolBox, under end user control) connects to the cloud server. Here, the client uploads LDAP information for authentication. Upon receiving this information, the server attempts to authenticate the client at step 502. Authentication at this point is guided by the permission model in place at the deployment. For example, a simple permission model is to accept all users (e.g., of a given firm), with each new user connecting to the server being registered and associated with a default license (i.e., default license for a new user on that cloud). If authentication succeeds (i.e., "true" at step 503), the method may proceed to the next step (step 504). Otherwise (i.e., "false" at step 503), authentication fails and the method terminates. At step 504, the server downloads to the client its catalog of available software products. Once downloaded, the catalog is displayed at the client in a scrollable browser interface (as previously described above).

At this point, the end user may elect to configure a product or launch a product, as indicated by step 505. In the event that the user elects to launch a software product (i.e., instant-on product), the method proceeds to the steps illustrated in FIG. 5B. At step 511, a "launch" request is sent to the server from the client. In response to this request, the server downloads a license slip file to the client, as shown at step 512. (In the case that a more complex permission model is in place at the deployment, additional access control steps are taken to verify that the request is permitted.) The slip file itself is a license metadata file indicating how the client is licensed (e.g., concurrent user license). The launched product refers to the license slip file in order to obtain the license it needs to operate. After downloading of the license slip file for the product, the server next makes the product's location (e.g., network share) available to the client, as indicated at step 513. Now, the client (ToolBox) launches the software product, at step 514. (Optionally at this point, the user can select a particular version and/or configuration of the product, before launching.) Upon being launched, the product references the license file to determine the appropriate license to request (i.e., one appropriate to this client's use of the product), at step 515. Finally, at step 516, the product is activated with the appropriate license, thus permitting the client to proceed with licensed use of the product. Thereafter, the client may continue the cloud session (for this or other products), or the client may disconnect.

In the event that the user elects to install a software product (i.e., not instant-on product), the method proceeds to the steps illustrated in FIG. 5C. The workflow is similar to the instant-on workflow; however, the result is very different by virtue of the application's installer being downloaded. The steps are as follows. At step 521, an "install" request is sent to the server from the client. In response to this request, the server downloads a license slip file to the client, as shown at step 522. (If desired, additional access control steps can be taken to verify that the request is permitted.) Again, the slip file itself represents an informational file indicating how the client is licensed (or can obtain an appropriate license from the cloud). The installed product, once launched, refers to the license slip file in order to obtain the license it needs to operate. After downloading of the license slip file for the product, the server next makes the location of the product's installer (e.g., network share) available to the client, as indicated at step 523. Now, the installer for the software product is launched, at step 524. (As was the case with instant-on, the user can optionally select a particular version and/or configuration of the product, before installation.) Upon being installed and then launched, the product references the license file to determine the appropriate license to request (i.e., one appropriate to this client's use of the product), at step 525. Finally, at step 526, the fully-installed product is activated with the appropriate license, thus permitting the client with licensed use of the product. Thereafter, the client may continue the cloud session (for this or other products), or the client may disconnect.

B. Construction of a Tool Cloud Application (TCA)

Figure 6:
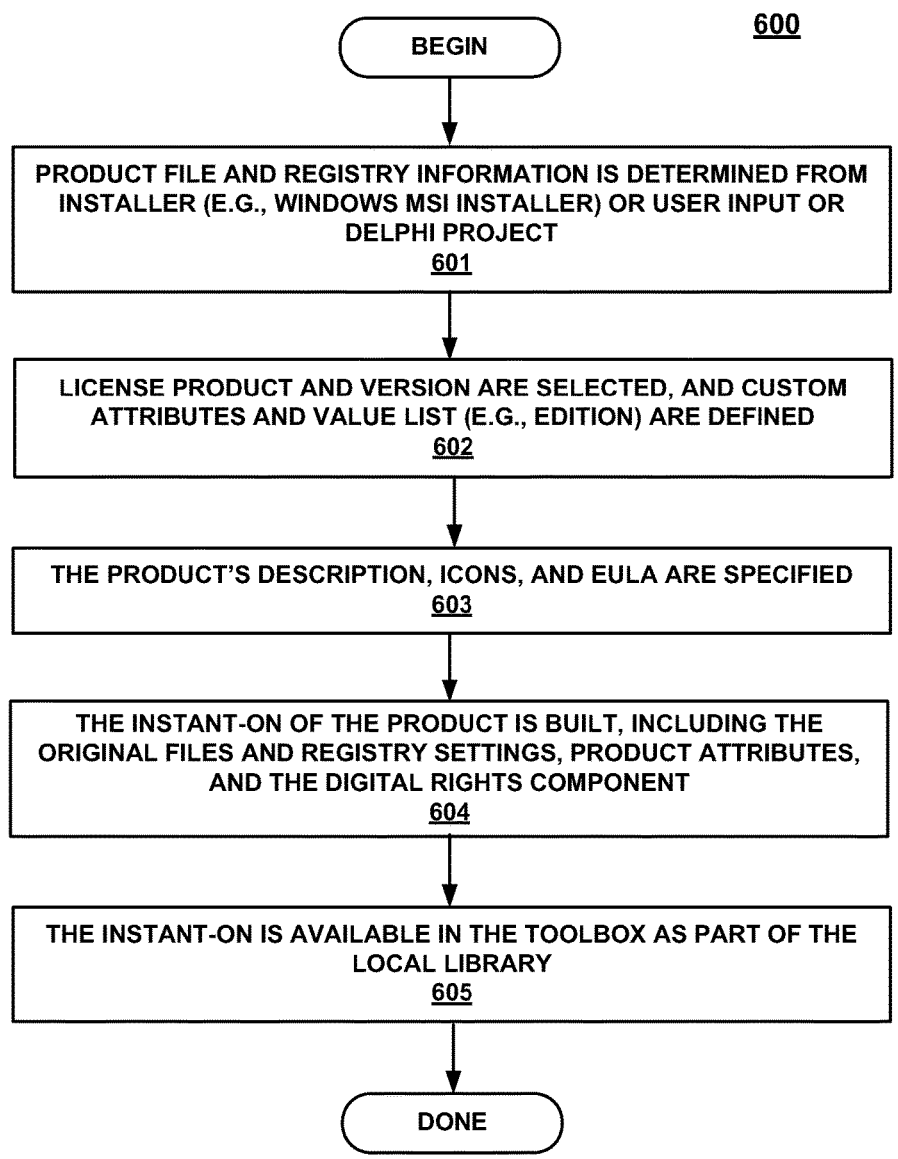
FIG. 6 is a detailed flow diagram illustrating a method for converting an existing install file (e.g., Microsoft Windows Installer .MSI install file) into an instant-on application that runs with appropriate file and registry settings, as well as protected (virtual) file and registry settings in accordance with embodiments of the present technology.

FIG. 6 is a detailed flow diagram illustrating a method 600 of the present technology for converting an existing install file (e.g., Microsoft Windows Installer .MSI install file) into an instant—on application that runs with appropriate file and registry settings, as well as protected (virtual) file and registry settings. The product browser includes allows the customer or administrator user (i.e., user upstream from the end user) to create, from an existing install file (e.g., Microsoft Windows Installer .MSI install file), an instant-on program that is fully licensed and works (i.e., run on a user machine) without having to actually install the program (e.g., execute the .MSI Installer). Detailed information about the Microsoft Windows Installer and .MSI files is available on the Microsoft Developer Network (MSDN), for example currently at MSDN Library|Win32 and COM Development|Administration and Management|Application Installation and Services|Windows Installer. Those skilled in the art, enabled by the teachings herein, will appreciate that the method need not be tied to the Microsoft Windows Installer but can instead by adapted for other installers.

The method 600, which is performed by a Tool Cloud Application wizard, proceeds as follows. Contained within the pre-existing install file is information about file usage (e.g., directory set up) and registry settings. At step 601, a Tool Cloud Application (TCA) model is populated with information about the application being enabled for the Tool Cloud distribution. The TCA model can be populated from a variety of sources including an MSI installer (e.g., Microsoft Windows Installer), an Embarcadero® RAD Studio Delphi® or C++ project, or a custom application. A listing of files organized by common directories (e.g., program files, application data, etc.) is managed by the model as is a listing of registry settings and environment variables. The ToolBox determines the product file and registry information from the installer (e.g., Windows Installer) or received as input from the user (e.g., employee of the product's vendor) or project settings. For example, this information may be interpreted from an MSI installer by parsing out the MSI contents, extracting all files, registry keys and values, environment variables, and any custom actions executed by the installer. This allows the ToolBox to determine, for example, what default install location and special registry keys are set during (normal) installation of the program. Any custom actions are executed separately with all interactions with the file system, registry and environment variables being intercepted and replaced with a virtual environment so as not to affect any changes on the actual system. Each element in the TCA file is assigned identifying attributes to indicate their position in the instant-on application. Some files remain private to the application and others are written to the host system and are visible to the host environment. Preferably, this file and registry information is displayed to the ToolBox user together with an application GUID (globally unique identifier) specified by the installer (e.g., Windows Installer), with the user given the option to edit the information and/or add new information.

Now, the licensed product (e.g., activation for concurrent seat license) and version are selected (e.g., by the ToolBox user, from the ToolBox user interface), and any custom attributes and value list (e.g., edition) are defined. At step 602, therefore, the user interacts with the licensing server to create an account and configure the application's license settings. Each license belongs to a product with a version and can have custom attributes defined. The attributes are encrypted into each generated license and can be read by the licensed application to gain information about the assigned license. For added security, the user has the option to embed license checks within their application source code. Information embedded in this way can limit the functionality of the application based on the assigned license. In the background, selection of the licensed product triggers a call to a licensing server (Embarcadero Licensing Server) to allow the ToolBox user to input licensing parameters or attributes. In response to these input parameters, the licensing server creates the license "slip file" to be deployed with the instant-on application (which, at execution, checks the slip file for appropriate licensing rights). If desired the ToolBox user can embed additional licensing checks within the product's code. For example at strategic points during product installation or usage (including upsell features), the product's code may invoke licensing calls (ToolBox "Check License" API call) to confirm the current licensing status. Thereafter, at step 603, the product's name and description, icons (for the instant-on executable), and end user license agreement are specified. These are included in the model. Other instant-on relevant metadata, such as a "splash screen," may be specified at this point. In typical usage, the product metadata (e.g., name, icons, splash screen, EULA, etc.) specified for the instant-on application will correlate closely to the regular (i.e., non-instant-on) application.

At step 604, the instant-on product is built/emitted using the information in the TCA model. Here, the system takes all of the information and components parsed from the preexisting install file and combines that with the above-specified ToolBox user input (i.e., configuration information and metadata) and license information (including any optional checkpoints), to generate a self-contained standalone instant-on executable (e.g., .exe) file that end users may download and run. The instant-on application includes or is in communication with a license application (or embedded program logic) that serves as the gate keeper to the user application. Now that the instant-on executable has been created, it can be copied over to the ToolBox library, as indicated at step 605. The instant-on application can be accessed from the library by selecting (e.g., double-clicking) it, as well as exported to other libraries for access by other users. When an end user launches the instant-on, the license application checks for a valid license or prompts the user to license it. In one embodiment, the application is a .app file format instead of instant-on product or application. When a valid license is found, the user application is launched.

Figure 7:
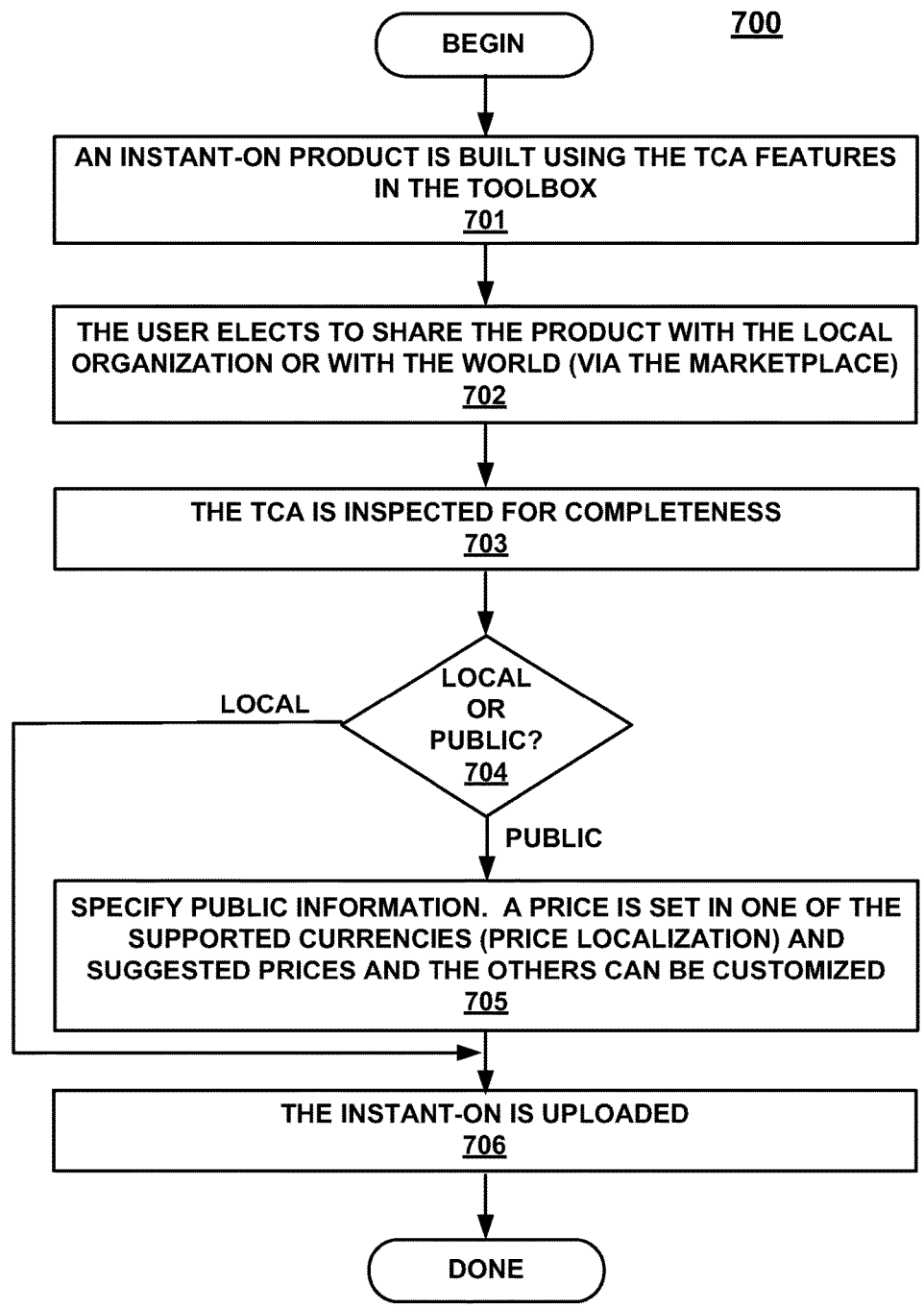
FIG. 7 is a detailed flow diagram illustrating a method for building a Tool Cloud Application (TCA) and uploading or publishing it to a local tool cloud or public tool cloud ("Marketplace") in accordance with embodiments of the present technology.

C. Publication of the Tool Cloud Application (TCA) to the Local Cloud and/or Marketplace FIG. 7 is a detailed flow diagram illustrating a method 700 for uploading or publishing the Tool Cloud Application (TCA) to a local tool cloud or public tool cloud ("Marketplace"). At step 701, the user launches the TCA wizard to create a tool cloud enabled application (TCA) as previously described (method 600). An existing application can be edited using a tabbed workspace integrated right inside the ToolBox. The instant-on file is produced and is available to be run in the local ToolBox. Once the ToolBox user is ready to publish the instant-on application, the user chooses to share the instant-on with either a local tool cloud (his or her organization) or with a public tool cloud (i.e., "Marketplace" or public store) at step 702. At step 703, the TCA is inspected for completeness.

If the user is sharing the TCA publicly with the Marketplace, tested at step 704, additional content is specified at step 705 for the public store, including a description of the product, a graphic, and pricing. Pricing can be set by product variant or for the product. A product that sells by edition can have a unique price specified for each edition. Variants are specified in the license and are defined when building a license for the application. A price can be set in one of the supported currencies, including Yen, US Dollar, Euro, British Pound, and the like. When the price is set, it is converted at current exchange rates to all other supported currencies. If desired, the user then can edit those prices to round them nicely or account for reasonable pricing and market differences, or the like. Finally, at step 706, the instant-on application is uploaded to the Marketplace or local cloud and is now available to end users having approved access. At this step, the ToolBox user uploading to the Marketplace is required to have appropriate vendor approval, that is, a vendor that is preapproved by the cloud server authority (e.g., Embarcadero Technologies, Inc.). Optionally, the authority may impose administrative clearance requirements before a given instant-on application is made available from the Marketplace.

D. Source Code Implementation (1) Connect to Toolcloud and Display Products Implementation Details In accordance with the present technology, the above described operations are implemented as Web-based services ("Web Services"). In order to work with Web Services exposed by the ToolCloud and ToolBox, Embarcadero® RAD Studio's Web Service (Embarcadero Technologies, San Francisco, Calif.) importer tool is employed to generate an interface for the Web Service imported with member methods that maps Web Service methods and a function to create instances of such interfaces. For example, the following interface is generated for productWebService_v10 (authored in Embarcadero® RAD Object Pascal):

```
 1:     // ****************************************************************** //
 2:     // Namespace : http://v10.ws.server.allaccess.embarcadero.com
 3:     // transport : http://schemas.xmlsoap.org/soap/http
 4:     // style     : document
 5:     // binding   : productWebService_v10HttpBinding
 6:     // service   : productWebService_v10
 7:     // port      : productWebService_v10HttpPort
 8:     // URL       : http://ruspd-dtitov2/aaserver/services/productWebService_v10
 9:     // ****************************************************************** //
10:     productWebService_v10PortType = interface(IInvokable)
11:     ['{5FCEA1ED-057F-5C50-AF02-D0E2869993CF}']
12:         function getAllAccessLicensesLocation(const in0: string): ArrayOfString; stdcall;
13:         function getAllAccessLicenseLocation(const in0: string): string; stdcall;
14:         function getProductsByConfigId(const in0: string; const in1: string): ArrayOfProduct; stdcall;
15:         function getDocumentForVersion(const in0: string; const in1: string; const in2: string): ArrayOfDocument; stdcall;
16:         function getAllProducts(const in0: string): ArrayOfProduct; stdcall;
17:         function getProducts(const in0: string): ArrayOfProduct; stdcall;
18:         function getBuildsByConfiguration(const in0: string; const in1: string): ArrayOfBuildFile; stdcall;
19:         function retrieveTrialLicenses(const in0: string; const in1: string; const in2: string; const in3: string): ArrayOfTrialLicenseFile; stdcall;
```

```
20:        end;
21:
22: function GetproductWebService_v10PortType(UseWSDL:
Boolean=System.False; Addr: string=''; HTTPRIO: THTTPRIO = nil):
productWebService_v10PortType;
```

Similarly, the following interface may be declared for UserManagementWebService_v20:

```
1:    // *****************************************************************
2:    // Namespace : http://v20.ws.server.allaccess.embarcadero.com
3:    // transport : http://schemas.xmlsoap.org/soap/http
4:    // style     : document
5:    // binding   : userManagementWebService_v20HttpBinding
6:    // service   : userManagementWebService_v20
7:    // port      : userManagementWebService_v20HttpPort
8:    // URL       :
http://localhost:808/aaserver/services/userManagementWebService_v20
9:    // *****************************************************************
10:         userManagementWebService_v20PortType = interface(IInvokable)
11:         ['{5F0C7739-C6D3-DA20-775D-F37E7780D6D7}']
12:         function getAllConfigurations(const in0: string; const in1:
ArrayOfString): ArrayOfWsConfiguration; stdcall;
13:         procedure resetPassword(const in0: string; const in1: Integer;
const in2: string); stdcall;
14:         function getUsersForConfigId(const in0: string; const in1:
string): ArrayOfWsUser; stdcall;
15:         function getSubGroupsForGroupId(const in0: string; const in1:
string): ArrayOfWsGroup; stdcall;
16:         function modifyUserGroup(const in0: string; const in1: string;
const in2: string; const in3: string; const in4: ArrayOfString; const
in5: ArrayOfString;
17:                     const in6: ArrayOfString): WsGroup;
stdcall;
18:         procedure removeUserGroup(const in0: string; const in1: string);
stdcall;
19:         function modifyUser1(const in0: string; const in1: string; cons
in2: string; const in3: string; const in4: string; const in5:
ArrayOfString
20:                     ): WsUser; stdcall;
21:         function getUsersForGroupId(const in0: string; const in1:
string): ArrayOfWsUser; stdcall;
22:         function getGroupsForConfigId(const in0: string; const in1:
string): ArrayOfWsGroup; stdcall;
23:         procedure removeConfiguration(const in0: string; const in1:
string); stdcall;
24:         procedure assignConfiguration2Groups(const in0: string; const
in1: string; const in2: ArrayOfString; const in3: ArrayOfString);
stdcall;
25:         procedure removeUser(const in0: string; const in1: string);
stdcall;
26:         function getGroupsForUserId(const in0: string; const in1:
string): ArrayOfWsGroup; stdcall;
27:         function getAllUserGroups(const in0: string; const in1:
ArrayOfString): ArrayOfWsGroup; stdcall;
28:         function login(const in0: string; const in1: string): string;
stdcall;
29:         function getConfigurationsForUserId(const in0: string; const
in1: string; const in2: Boolean): ArrayOfWsConfiguration; stdcall;
30:         procedure assignConfiguration2Users(const in0: string; const in1:
string; const in2: ArrayOfString; const in3: ArrayOfString); stdcall;
31:         function registerUser(const in0: string; const in1: string):
WsUser; stdcall;
32:         function getAllUsers(const in0: string; const in1:
ArrayOfString): ArrayOfWsUser; stdcall;
33:         function createConfiguration(const in0: string; const in1:
string; const in2: string; const in3: string; const in4: string;
const in5: ArrayOfProduct
34:                     ): WsConfiguration; stdcall;
35:         function getParentGroupsForGroupId(const in0: string; const in1:
string): ArrayOfWsGroup; stdcall;
36:         function modifyConfiguration(const in0: string; const in1:
string; const in2: string; const in3: string; const in4: string;
const in5: string;
37:                     const in6: ArrayOfProduct):
WsConfiguration; stdcall;
```

```
38:         function createUser(const in0: string; const in1: string; const
in2: string; const in3: string; const in4: ArrayOfString): WsUser;
stdcall;
39:         function getPrivileges(const in0: string): ArrayOfString;
stdcall;
40:         function modifyUser(const in0: string; const in1: string; const
in2: string; const in3: string; const in4: ArrayOfString): WsUser;
stdcall;
41:         function login1(const in0: string; const in1: string; const in2:
string): string; stdcall;
42:         function createUserGroup(const in0: string; const in1: string;
const in2: string; const in3: ArrayOfString; const in4:
ArrayOfString; const in5: ArrayOfString
43:                          ): WsGroup; stdcall;
44:         procedure changePassword(const in0: string; const in1: string);
stdcall;
45:         function getConfigurationsForGroupId(const in0: string; const
in1: string; const in2: Boolean): ArrayOfWsConfiguration; stdcall;
46:     end;
47: function GetuserManagementWebService_v20PortType(UseWSDL:
Boolean=System.False; Addr: string=''; HTTPRIO: THTTPRIO = nil):
userManagementWebService_v20PortType;
```

During toolcloud login phase, an instance of the above defined userManagementWebService_v20 interface is created. The interface's login method (defined at line 28) is called with login parameters either provided by the user or ToolBox itself. This login to the toolcloud call is initiated by a toolcloud instance (i.e., instance of TToolCloud class) which models a toolcloud inside ToolBox application; the toolcloud class, TToolCloud, may be defined as follows:

```
1: TToolCloud = class( TEntity )
2:     private
3:         FName: string;
4:         FPort: Word;
5:         FIsPortSet: boolean;
6:         FAddress: string;
7:         FWSDLPathOnServer: string;
8:         FSessionID: string;
9:
10:        FGroupMode:     TGroupProductsMode;
11:        FCloudType:     TToolCloudType;
12:        FOnConnectionFailed: TNotifyEvent;
13:        FOnLoginFailed:  TNotifyEvent;
14:
15:        function getName: string;
16:        function getAddress: string;
17:        function getPort: Word;
18:        procedure setName(const Value: string);
19:        procedure setAddress(const Value: string);
20:        procedure setPort(const Value: Word);
21:        function getWSDLPathOnServer: string;
22:        procedure SetWSDLPathOnServer(const Value: string);
23:        function getIsPortSet: boolean;
24:        function getIsServerAddressSet: boolean;
25:        function getIsWSDLPathOnServerSet: boolean;
26:
27:        function getGroupMode: TGroupProductsMode;
28:        function getIsPublic: Boolean;
29:        function getLoginSuccessful: Boolean;
30:
31:        function getSessionID: string;
32:
33:    protected
34:        procedure DoValidate( const Errors: IValidationErrors ); override;
35:
36:    public
37:        const DefaultName = 'Public';
38:        const DefaultWSDLString =
'/aaserver/services/productWebService_v10?wsdl'; //default WSDL path
39:        const DefaultUsageStatisticsWSDLString =
'/aaserver/services/usageStatisticsWebService_v20?wsdl'; //default
WSDL path for Usage statistics
40:        const DefaultUserManagementWSDLString =
'/aaserver/services/userManagementWebService_v20?wsdl';
41:        const DefaultProfilesWSDLString =
'/aaserver/services/profileBrowsingWebService_v10?wsdl';
```

-continued

```
 42:           const DefaultProfilesDownloadString =
'/aaserver/provisioningService?cmd=downloadProfileVersion&id=';
 43:
 44:
 45:           const DefaultServerAddress = 'http://localhost'; //default server
 46:           const DefaultPort = 80; //default port;
 47:
 48:           constructor Create; overload;
 49:           constructor Create( Name: string; ServerAddress:string; Port:word;
 50:                       CloudType: TToolCloudType ); overload;
 51:
 52:           procedure Assign( Other: TToolCLoud );
 53:
 54:           function getURLforWSDL( ): string; //get the full URL get get the
WSDL on this ToolCloud server
 55:           function getURLforUsageStatisticsWSDL( ): string; //get the full
URL get usage statistics WSDL on this ToolCloud server
 56:           function getURLForUserManagementWSDL( ): string;
 57:           function getURLforProfilesWSDL( ): string;
 58:           function getURLforProfileDownload(ProfileVersionId:integer):
string;
 59:
 60:           function getErrorMessage( ErrorCode: Integer ): string;
 61:
 62:           function Login( User: TToolBoxUser ): integer;
 63:           function Connect( User: TToolBoxUser ): integer;
 64:           function RegisterUser( User: TToolBoxUser ): integer;
 65:           function Connected: Boolean;
 66:
 67:           procedure LoginFailed;
 68:           procedure ConnectionFailed;
 69:
 70:     published
 71:           property Name: string read getName write setName;
 72:           property ServerAddress: string read getAddress write setAddress;
//ToolCloud server address
 73:           property Port: Word read getPort write setPort; //0 to 65535
//ToolCloud server port
 74:
 75:     public
 76:           property WSDLPathOnServer: string read getWSDLPathOnServer write
SetWSDLPathOnServer; // path to the WSDL on this Tool Cloud server
 77:           property IsPublic: Boolean read getIsPublic;
 78:
 79:           property IsServerAddressSet: boolean read getIsServerAddressSet;
// if False the DefaultServerAddres will be used
 80:           property IsPortSet: boolean read getIsPortSet; //if False the
DefaultPort will be used
 81:           property isWSDLPathOnServerSet: boolean read
getIsWSDLPathOnServerSet; // //if False the DefaultWSDLString will be
used
 82:
 83:           property ProductGroupMode: TGroupProductsMode read getGroupMode
write FGroupMode;
 84:
 85:           property SessionID: string read getSessionID write FSessionID;
 86:           property LoginSuccessful: Boolean read getLoginSuccessful;
 87:
 88:           property OnConnectionFailed: TNotifyEvent read
FOnConnectionFailed write FOnConnectionFailed;
 89:           property OnLoginFailed:     TNotifyEvent read FOnLoginFailed
write FOnLoginFailed;
 90:           end;
 91:
 92: function TToolCloud.Login(User: TToolBoxUser): integer;
 93: begin
 94:      Result := Connect( User );
 95:
 96:      if Result = Globals.SUCCESS then
 97:           // get user privileges
 98:           Result := AdministrationProvider.getPrivileges( FSessionID,
 99:
getURLForUserManagementWSDL,
100:                                  User.Privileges );
101: end;
```

Of particular interest are the Login and Connect member functions or methods of the class:

```
 1: function TToolCloud.Login(User: TToolBoxUser): integer;
 2: begin
 3:   Result := Connect( User );
 4:
 5:   if Result = Globals.SUCCESS then
 6:     // get user privileges
 7:     Result := AdministrationProvider.getPrivileges( FSessionID,
 8: getURLForUserManagementWSDL,
 9:                                         User.Privileges );
10: end;
11:
12:
13: function TToolCloud.Connect(User: TToolBoxUser): integer;
14: var
15:   cursor: TCursor;
16: begin
17:   try
18:     cursor := Screen.Cursor;
19:     Screen.Cursor := crHourGlass;
20:
21:     Result := AdministrationProvider.loginUser( self, User );
22:   finally
23:     Screen.Cursor := cursor;
24:   end;
25: end;
```

As shown, the Login method receives a TToolBoxUser instance that encapsulates all the parameters required to login and starts the login flow, by calling the Connect method. The Connect method authenticates the user and opens a Toolcloud session. The Connect method, after handling some UI aspects, defers internally the call to a loginUser method (defined in AdministrationProviderunit) for the purpose of handling all the details of invoking Web Services and converting the parameters to/from Web Service format and ToolBox format. The AdministrationProvider unit itself may be constructed as follows (portions removed for clarity of the present discussion):

```
 1: unit AdministrationProvider
 2:
 3:   interface
 4:
 5: [...]
 6: function loginUser( ToolCloud: TToolCloud; User: TToolBoxUser): integer;
 7: [...]
 8: function getPrivileges( SessionID, URLforWDSL: string; Privileges: TList<string> ): integer; overload;
 9:
10: implementation
11:
12: [...]
13: function loginUser( ToolCloud: TToolCloud; User: TToolboxUser ): integer;
14: var
15:   umws: userManagementWebService_v20PortType;
16: begin
17:   ToolCloud.SessionID := '';
18:
19:   try
20:     umws := GetuserManagementWebService_v20PortType(True,ToolCloud.getURLForUserManagementWSDL);
21:
22:     if umws <> nil then
23:     begin
24:       ToolCloud.SessionID := umws.login1(User.Domain, User.Username, user.Password);
25:       Result := Globals.SUCCESS;
26:     end;
27:
28:   except
29:     on E: Exception do Result := HandleWSException( E );
30:
31:   end;
32: end;
33:
34: [...]
35: function getPrivileges( SessionID, URLForWDSL: string; Privileges: TList<string> ): integer; overload;
36: var
37:   umws: userManagementWebService_v20PortType;
38: begin
39:   Privileges.Clear;
40:
41:   try
42:     umws := GetuserManagementWebService_v20PortType( True, URLForWDSL
);
43:
44:     if umws <> nil then
45:     begin
46:       Privileges.AddRange( umws.getPrivileges(SessionID) );
47:       Result := Globals.SUCCESS;
48:     end;
49:
50:   except
51:     on E: Exception do Result := HandleWSException( E );
52:
53:   end;
54: end;
```

The loginUser method (line 13) creates internally an instance of userMamanegent WebService (umws) by calling GetuserManagementWebService_v20PortType with the URL for WebService as its main parameter; it also invokes the Login method, passing in the required login parameters: Domain, Username and Password. When login is successful, the toolcloud sends back a SessionID value to identify the user session on that ToolCoud, which is kept for subsequent calls to WebService methods in the SessionID member of the ToolCloud instance. In case of login failure, a specific exception is thrown by ToolCoud, which is handled by a try . . . except block (lines 19-31 above) and converted to a ToolBox internal error code. This error code is processed by modules that initiated the ToolCloud connect flow and is displayed in a user friendly format within error message box.

The retrieval of toolcloud products is achieved with the help of a TToolCloudsPresenter class, which may be defined as follows (portions omitted for clarity of discussion):

```
 1: TToolCloudsPresenter = class( TPresenter )
 2:
 3:   type
 4:     TConnectToToolCloud = class( TInterfacedInstance, IAction )
 5:     protected
 6:       FActionImpl:   IActionImpl;
 7:       FPresenter:    TToolCloudsPresenter;
 8:
 9:       FConnectParams: TLoginParams;
10:
11:       function Connect: LRESULT;
12:
13:       { IInstance }
14:       function IsEqual( Instance: IInstance ): Boolean; override;
15:
16:     public
17:       constructor Create( Presenter: IPresenter; const LoginParams: TLoginParams );
18:       destructor Destroy; override;
19:
20:       class function CreateAction( Presenter: IPresenter; Params: Pointer ): IAction;
```

```
21:
22:     property ActionImpl: IActionImpl read FActionImpl write
FActionImpl implements IAction;
23:
24:     end;
25:
26: protected
27:   View: IView;
28:
29:   FToolCloudsPane:   TExplorerPane;
30:
31:   FToolCloudMenu:    TPopupMenu;
32:   FLoginInfoMenu:    TPopupMenu;
33:
34:   FToolCloudList:    TToolCloudList;
35:   FToolCloudPresenter: IPresenter;
36:
37:   FChargeToolboxPresenter: IPresenter;
38:   FLoginPresenter:   IPresenter;
39:
40:   FProductsController: TProductsController;
41:
42:   [...]
43:
44: public
45:   constructor Create( AOwner: TComponent ); override;
46:   destructor Destroy; override;
47:
48:   procedure AfterConstruction; override;
49:
50:   procedure LoadFromConfig;
51:   procedure SaveToConfig;
52:
53:   function connectToToolCloud( ToolCloud: TToolCloud ): Boolean;
overload;
54:
55:   procedure connectToToolCloud( ToolCloudName: string ); overload;
56:
57:   function disconnectFromToolCloud( ToolCloudName: string ):
Boolean; overload;
58:   function disconnectFromToolCloud( ToolCloud: TToolCloud ):
Boolean; overload;
59:
60:   function LoadToolCloudProducts( ToolCloud: TToolCloud;
Products: TList<TProductItem> ): Boolean;
61:
62:   [...]
63: end;
```

In particular, the workflow to retrieve toolcloud products is triggered by invoking the LoadToolCloudProducts method (line 60) of the TToolCloudsPresenter class, which is the class that handles all the aspects of working with toolcouds in the user's system. The LoadToolCloudProducts method may be implemented as follows:

```
1: function TToolCloudsPresenter.LoadToolCloudProducts( ToolCloud:
TToolCloud;
2:                          Products:
TList<TProductItem> ): Boolean;
3: var
4:   product: TProductItem;
5: begin
6:   Result := False;
7:
8:   try
9:     if Assigned( ToolCloud ) and loginToToolCloud( ToolCLoud )
10:     then begin
11:       Result := Assigned( ToolCloud ) and
12:         FProductsController.GetProductList( ToolCloud,
13:                       Products );
14:     //if no product is returned inform the user
15:     if Result and (Products <> nil) and (Products.Count = 0) then
16:       begin
17:         MessageFrm( Application.MainForm, mfInfo,
Format(StrNoProductsAvailable, [User.LoginToken]) );
18:       end;
19:     if Result then
20:     begin
21:       FProductsController.LoadProductsConfiguration( Products );
22:
23:       // init defaults
24:       for product in Products do
25:         product.InitProductsDefaults;
26:       [...]
27:     end;
28: [...]
29: end;
```

As shown, the method receives the toolcloud instance (Tool-Cloud) indicating which products should be loaded, together with the list in which the products must be filled in case of success. Internally after checking parameter validity and proper context (i.e., existence of a proper toolcloud connection), the method uses FProductController (see TProductsController below) to perform the WebService call and conversion between parameters format used by the Web Service format used in the ToolBox.

Thereafter, the system may proceed to retrieve privileges, as configured on the toolcloud for that (current) user, in order to update the ToolBox UI accordingly—that is, show/hide or enable/disable components and controls, as appropriate for the current user's privileges. Here, the above-mentioned ToolCloud.Login method calls the AdministrationProvider.getPrivileges function defined and implemented as above with a similar flow as the loginUser method described above. In particular, the getPrivileges WebService method receives a SessionID parameter and returns an array of strings that identify to which ToolBox functionalities the logged-in user has access to. The list of privileges is stored in the Privileges member of the TToolBoxUser instance which has been passed in to the ToolCloud.Login method. This is used by the ToolBox core to update the UI at the end of the connect-to-toolcloud workflow. After that ToolCloud connection has been established and the UI updated, the ToolBox attempts to load products to which the logged-in user has access and display them according to display product settings. The TProductsController class (including GetProductList class method) may be defined as follows:

```
1: type TProductsController = class
2: strict private
3:   FConfig: IPersistence;
4:
5: public
6:   constructor Create;
7:   destructor Destroy; override;
8:   function GetProductList( ToolCloud: TToolCloud;
9:                        ProductList: TList<TProductItem> ):
Boolean;
10:   function GetAllProducts( ToolCloud: TToolCloud;
11:                        ProductList: TList<TProductItem> ):
Boolean;
12:
13:   procedure LoadProductsConfiguration( PProductList:
TList<TProductItem> );
14:   procedure SaveProductsConfiguration( PProductList:
TList<TProductItem> );
15:   class function GetInstalled( BuildFileItem: TProductBuildFile ) :
TProductBuildFile;
16:   class procedure AddInstalledProducts( Result:
TList<TProductItem> );
```

-continued

```
17:   class function HasInstalledBuildFile( PProductVersion:
TProductVersion): boolean; static;
18: end;
19:
20: function TProductsController.GetProductList( ToolCloud:
TToolCloud;
21:                         ProductList:
TList<TProductItem> ): Boolean;
22: begin
23:   Result := TToolCloudConnection.getProducts( ToolCloud,
ProductList );
24:   if Result then
25:   AddInstalledProducts( ProductList );
26: end;
```

As shown (lines 20-26), a ToolCloudConnection instance invokes a GetProductList member function to establish a connection with a particular toolcloud (ToolCloud) and gets the list of products (ProductList). If the list is not empty ("if" statement at line 25 evaluates to True), that product list may be added to one's ToolBox.

The toolcloud connection, TToolCloudConnection, which may be implemented as follows:

```
1: type TToolCloudConnection = class sealed
2:      public
3:         class function getLoginToken: string;
4:         class function getProducts( ToolCloud: TToolCloud;
5:                       ProductList: TList<TProd
): Boolean;
6:         class function getAllProducts( ToolCloud: TToolCloud
ProductList: TList<TProductItem> ): Boolean;
7:         class function getProfiles( ToolCloud: TToolCloud;
8:                       ProfileList: TList<TProf
9:                       ProductVersion :TProduct
): Boolean;
10:
11:        class function GetUsageStatisticsProvider(
12:                       PURLforWSDL: string ):
IUsageStatisticsProvider;
13:
14:        class function getAllAccessLicensesLocation(TToolClou
TToolCloud;
15:                       var LicenseLocations:
productWebService_v10.ArrayOfString): Boolean;
16:
17:        class function getTrialLicenses( ToolCloud: TToolClo
18:                       Licenses:
TList<TTrialLicenseFile> ): Boolean;
19:     end;
20:
21: class function TToolCloudConnection.getProducts( ToolCloud:
TToolCloud;
22:                       ProductList
TList<TProductItem> ): Boolean;
23: var
24:    pws: productWebService_v10PortType;
25:    products: ArrayOfProduct;
26:    login: string;
27: begin
28:    Result := False;
29:
30:    pws := GetproductWebService_v10PortType( True,
ToolCloud.getURLforWSDL );
31:
32:    if pws <> nil then
33:    begin
34:      products := pws.getProducts( ToolCloud.SessionID );
35:      ConvertProductTypes( products, ProductList );
36:      Result := True;
37:    end
38:    else
39:      TLog.GetInstance.Error( 'productWebService_v10PortType is
nill' );
40: end;
```

In particular at lines 21-40, the getProducts member function receives a particular ToolCloud instance for which products should be retrieved, together with the list to be filled (with those products). It returns a Boolean value indicating whether the call was successful.

Internally an instance of productWebService_v10 is created by invoking a GetproductWebService_v10PortType function; then, the getProducts method exposed by WebService is invoked passing in as a parameter the SessionID. The webService method returns an array of products in the WebService format. Therefore, a conversion is employed to translate this into a format used by ToolBox to represent products (ConvertProductTypes call). Next, TToolCloudConnection.getProdcuts returns the products controller which iterates over products. For each version checked, it adds entries for any installed applications found on the local machine. Thereafter, the ProductsController.getProducts method returns successfully. TToolCloudPresenter.LoadToolCloudProducts is invoked to check and load configurations for default version and builds, and returns True to report success to the caller.

(2) Launch a Product

The launch of a product can be invoked from several places in UI but in all the cases it is handled by an instance of the TProductPresenter class, which deals with all aspects of interacting with a product in the user's ToolBox.

From the UI (and via Delphi® dynamic method invocation), the CMDLaunch method is invoked with build file pointer packed in its Command argument if the build to be launched as an instant-on or an installed application, and CMDInstall if the build is an installer application. In particular, the role of the CMDLaunch and CMDInstall methods is to unwrap the product build parameter and invoke the appropriate method Launch/Install methods that will, in turn, perform the required action.

```
1: TProductPresenter = class( TPresenter, IPresenter )
2:
3:      type
4:        IProductContext = interface
5:          function IsValid: Boolean;
6:        end;
7:
8:        TToolCloudContext = class( TInterfacedObject, IProductC
9:        protected
10:         FPresenter:  TProductPresenter;
11:         FToolCloudName: string;
12:
13:         function IsValid: Boolean;
14:
15:       public
16:         constructor Create( Presenter: TProductPresenter );
17:
18:       end;
19:
20:       TLocalLibraryContext = class( TInterfacedObject,
IProductContext )
21:       protected
22:         FPresenter:  TProductPresenter;
23:         FPackageName: string;
24:
25:         function IsValid: Boolean;
26:
27:       public
28:         constructor Create( Presenter: TProductPresenter );
29:
30:       end;
31:
32:       TConfigureProduct = class( TInterfacedInstance, IAction
33:       protected
34:         FActionImpl:  IActionImpl;
35:         FPresenter:   TProductPresenter;
```

-continued

```
36:         FProductName: WideString;
37:
38:         FContext: IProductContext;
39:
40:         function Configure: LRESULT;
41:         procedure CaptureContext;
42:
43:      public
44:         constructor Create( Presenter: TProductPresenter; ProductName: WideString );
45:         destructor Destroy; override;
46:
47:         class function CreateAction( Presenter: IPresenter; Params: Pointer ): IAction;
48:
49:         property ActionImpl: IActionImpl read FActionImpl write FActionImpl implements IAction;
50:      end;
51:
52:   protected
53:      [...]
54:      procedure CMDLaunch( var Command: TCommand ); message CMD_LAUNCH;
55:      procedure CMDInstall( var Command: TCommand ); message CMD_INSTALL;
56:      procedure CMDUninstall( var Command: TCommand ); message CMD_UNINSTALL;
57:
58:      [...]
59:      procedure Launch( Build: TProductBuildFile );
60:      procedure Install( Build: TProductBuildFile );
61:      procedure UnInstall( Build: TProductBuildFile );
62:      procedure Download( Build: TProductBuildFile );
63:      procedure CancelDownload( Build: TProductBuildFile );
64:      procedure ResumeDownload( Build: TProductBuildFile );
65:
66:   public
67:      constructor Create( Owner: TComponent ); override;
68:      destructor Destroy; override;
69:
70:      [...]
71:   end;
```

Of particular interest are the CMDLaunch and CMDInstall class methods, which serve respectively as front-ends to Launch and Install methods:

```
1: procedure TProductPresenter.CMDLaunch( var Command: TCommand );
2: begin
3:    if TObject( Command.Params ) is TProductBuildFile then
4:       Launch( TProductBuildFile(Command.Params) );
5: end;
6:
7: procedure TProductPresenter.CMDInstall( var Command: TCommand );
8: begin
9:    if TObject(Command.Params) is TProductBuildFile then
10:      Install( TProductBuildFile(Command.Params) );
11: end;
12:
13: procedure TProductPresenter.Launch(Build: TProductBuildFile);
14: var
15:    LProductItem: TProductItem;
16:    LUser: TToolBoxUser;
17:    LToolCloudList: TToolCLoudList;
18: begin
19:    if Assigned( Build ) then
20:    begin
21:       LProductItem   := getProduct;
22:       LToolCloudList := getToolCloudList;
23:       LUser          := getUser;
24:
25:       if Assigned(LProductItem) and
26:          Assigned(LToolCloudList) and
27:          Assigned(LUser) then
28:       begin
29:          with TLaunchAction.Create( LToolCloudList.ActiveToolCloud,
30:                                    LUser.LoginToken,
31:                                    Build ) do
32:             Execute;
33:          end;
34:    end;
35: end;
36:
37: procedure TProductPresenter.Install(Build: TProductBuildFile);
38: var
39:    newBf: TProductBuildFile;
40:    BuildFiles: ArrayOfTProductBuildFile;
41: begin
42:    if Assigned(Build) and Assigned(build.ProductVersion) then
43:    begin
44:       Launch( Build );
45:
46:       newBf := TProductsController.GetInstalled( Build );
47:
48:       if newBf <> nil then
49:       begin
50:          BuildFiles := Build.ProductVersion.BuildFiles;
51:          SetLength ( BuildFiles, Length( BuildFiles ) + 1 );
52:          BuildFiles[ Length( BuildFiles ) - 1] := newBf;
53:
54:          Build.ProductVersion.BuildFiles := BuildFiles;
55:
56:          // set the installed as default
57:          Build.ProductVersion.setDefaultBuildFile( newBf );
58:       end;
59:    end;
60: end;
```

From the UI (and via Delphi® dynamic method invocation), the CMDLaunch method is invoked with build file pointer packed in its Command argument if the build to be launched as an instant-on or an installed application, and CMDInstall if the build is an installer application. In particular, the role of the CMDLaunch and CMDInstall methods is to unwrap the product build parameter and invoke the appropriate method Launch/Install methods that will, in turn, perform the required action.

The Launch method extracts the context for launch action and creates an instance of TLauchAction defined as follows:

```
1: TLaunchAction = class
2:    FProductBuildFile: TProductBuildFile;
3:    FToolCloud: TToolCloud;
4:    FUser: string;
5: public
6:    constructor Create( ToolCloud: TToolCloud;
7:                        User: string;
8:                        BuildFile : TProductBuildFile );
9:    procedure Execute;
10: end;
```

As shown, the LaunchAction method invokes an Execute method in order to actually launch the product. The Execute method also performs the following actions: Identify the place where the application should be launched (locally or network) based on the BuildFile passed in; Setup licenses for the given product to be launched; Identify the executable and the parameters required to run the product; Launch the .exe file and return if build is an instant-on, or block the ToolBox UI until the application exits if the build is an installer; and Handle errors (if any) and report them in a user friendly format using error message boxes.

(3) Charging Products Workflow

Program logic for charging the products wizard is contained in a TChargeToolboxPresenter class, which may be defined as follows:

```
1: TChargeToolboxPresenter = class( TPresenter )
2:
3:   type
4:     TGetSelectedSizeText = function( Product: TProductItem ): WideString of object;
5:
6:     TSelectedSizeAttribute = class( TAttribute )
7:     protected
8:       FGetter: TGetSelectedSizeText;
9:
10:       function getText: WideString; override;
11:
12:     public
13:       constructor Create( Product: TProductItem; AttributeName: WideString; Getter: TGetSelectedSizeText );
14:
15:     end;
16:
17: protected
18:    FToolCloud:         TToolCloud;
19:
20:    FToolCloudProducts: TObjectList<TProductItem>;
21:    FProductVersions:   TObjectList<TProductItem>;
22:    FSelectedProducts:  TObjectList<TProductItem>;
23:
24:    function getToolCloudList: TToolCloudList;
25:    function getLocalLibraryPresenter: IPresenter;
26:
27:    function getToolCloudProducts: TList<TProductItem>;
28:    function getProductVersions: TList<TProductItem>;
29:    function getSelectedProducts: TList<TProductItem>;
30:
31:    function getToolCloudProduct( ProductName: WideString ): TProductItem ;
32:    function getSelectedProduct( ProductName: WideString; var SelectedProduct: TProductItem ): Boolean;
33:    function getProductSelectedItemsSize( Product: TProductItem ): WideString;
34:
35:    { IPresenter }
36:    procedure InitView( View: IView ); override;
37:
38:    // commands
39:    procedure CMDSetToolCloud( var Command: TCommand ); message CMD_SETTOOLCLOUD;
40:    procedure CMDLoadProducts( var Command: TCommand ); message CMD_LOADPRODUCTS;
41:    procedure CMDSelectProduct( var Command: TCommand ); message CMD_SELECTPRODUCT;
42:    procedure CMDSelectProductVersion( var Command: TCommand ); message CMD_SELECTPRODUCTVERSION;
43:    procedure CMDChargeToolBox( var Command: TCommand ); message CMD_CHARGETOOLBOX;
44:    procedure CMDLoadProductVersions( var Command: TCommand ); message CMD_LOADPRODUCTVERSIONS;
45:    procedure CMDCheckFilter(var Command: TCommand); message CMD_CHECKFILTER;
46:    procedure CMDFilterSelect(var Command: TCommand); message CMD_FILTERSELECT;
47:    procedure CMDFilterUnselect(var Command: TCommand); message CMD_FILTERUNSELECT;
48:
49:    // message handlers
50:    procedure MSGToolCloudListChanged( var Message: TMessage ); message MSG_TOOLCLOUDLISTCHANGED;
51:    procedure MSGDownloadFinished( var Message: TMessage ); message MSG_DOWNLOADFINISHED;
52:
53:    procedure ChargeProducts( Products: TList<TProductItem>; ChargeOptions: TChargeOptions );
54:    procedure ChargeAllProducts( ChargeOptions: TChargeOptions );
55:    procedure ChargeSelectedProducts;
56:
57:    procedure SelectProduct( Product: TProductItem; ChargeOptions: TChargeOptions; SelectedBuilds: TStringList = nil );
58:    procedure UnselectProduct( Product: TProductItem );
59:
60:    function ChargeBuild( Build: TProductBuildFile;
61:              ChargeOptions: TChargeOptions): boolean;
62:
63:    procedure SelectVersion(ASelectedProduct: TProductItem; AVersion: TProductVersion; BuildTypes: TChargeOptions);
64:
65: public
66:    constructor Create( Owner: TComponent ); override;
67:    destructor Destroy; override;
68:
69: published
70:    property ToolCloud: TToolCloud read FToolCloud;
71:    property ToolCloudList: TToolCloudList read getToolCloudList;
72:
73:    property Products: TList<TProductItem> read getToolCloudProducts;
74:    property Versions: TList<TProductItem> read getProductVersions;
75:    property Selection: TList<TProductItem> read getSelectedProducts;
76:
77:    property LocalLibraryPresenter: IPresenter read getLocalLibraryPresenter;
78: end;
```

Of particular interest are the toolcloud from which products are charged and the list of products to be charged (defined by user when using actions performed in wizard.)

The method that is invoked by the UI to start charging is CMDChargeToolBox, which gets invoked (through Delphi® dynamic method invocation mechanism) when a Charge link in pressed in any wizard page. The method may be defined as follows:

```
1: procedure TChargeToolboxPresenter.CMDChargeToolBox(var Command: TCommand);
2:
3:     function ChargingBuilds: Boolean;
4:     var
5:         product: TProductItem;
6:         version: TProductVersion;
7:         build:   TProductBuildFile;
8:     begin
9:         Result := False;
10:
11:         for product in FSelectedProducts do
12:             for version in product.getVersions do
13:                 for build in version.BuildFiles do
14:                     if build.IsDownloadInProgress then
15:                     begin
16:                         result := True;
17:                         break;
18:                     end;
19:     end;
20:
21: var
```

```
22:      chargeOptions: TChargeOptions;
23: begin
24:      chargeoptions := PChargeOptions(Command.Params)^;
25:
26:      if AllProducts in chargeOptions then ChargeAllProducts(
ChargeOptions );
27:      if SelectedProducts in chargeOptions then ChargeSelectedProducts( );
28:
29:      // check if there is any build in download for selected products
and display download view
30:      if ChargingBuilds then
31:           TToolCloudsPresenter(Owner).ApplicationPresenter.Execute(
CMD_CHANGETOOLVIEW, Pointer(DownloadsViewID) )
32:      else
33:           // display toolcloud product list
34:           LocalLibraryPresenter.Execute( ACT_SELECTPACKAGE,
PWideChar(SAllAccessPackage) );
35: end;
```

As shown, the method receives (within the TCommand argument) a pointer to TChargeOptions enum (enumerated) set, which is implemented as follows:

```
1: TChargeOption = (AllProducts, SelectedProducts, LatestVersions,
AllBuilds, InstantONs, Installers);
2: TChargeOptions = set of TChargeOption;
3: PChargeOptions = ^TChargeOptions;
```

As shown, this allows specification of AllProducts or SelectedProducts, as well as LatestVersions, AllBuilds, InstantONs, and Installers.

If AllProducts is specified then ChargeAllProducts is called; otherwise, if SelectedProducts is specified the ChargeSelectedProducts method is called. Both these functions in turn call the ChargeProducts method, with the difference being the list of products to be charged. The ChargeAllProducts method may be implemented as follows.

```
1: procedure TChargeToolboxPresenter.ChargeAllProducts( ChargeOptions:
TChargeOptions );
2:
3: begin
4:      // make sure download icons thread is stopped
5:      IconCache.Instance.ProductIcons.CancelDownload;
6:
7:      // load toolcloud products
8:      FSelectedProducts.Clear;
9:      if TToolCloudsPresenter(Owner).LoadToolCloudProducts( FToolCloud,
FSelectedProducts ) then
10:          begin
11:              ChargeProducts( FSelectedProducts, ChargeOptions );
12:          end;
13: end;
14:
15: procedure TChargeToolboxPresenter.ChargeSelectedProducts;
16: begin
17:      ChargeProducts( FSelectedProducts, [AllBuilds] );
18: end;
```

ChargeAllProducts loads all the products available to the logged-in user and passes this list to ChargeProducts along with ChargeOptions parameter received. The ChargeSelectedProducts method passes ChargeProducts the list of products as selected by the user using the last two wizard pages and the AllBuilds option (as the product filtering has been already performed).

The ChargeProducts method may be implemented as follows:

```
1: procedure TChargeToolboxPresenter.ChargeProducts( Products:
TList<TProductItem>;
 2:                        ChargeOptions:
TChargeOptions );
 3: var
 4:      product: TProductItem;
 5:      version: TProductVersion;
 6:      build:   TProductBuildFile;
 7:
 8:      builds: TList<TProductBuildFile>;
 9:      params: TAddBuildsToPackage;
10: begin
11:      builds := TList<TProductBuildFile>.Create;
12:      params := TAddBuildsToPackage.Create( builds, nil );
13:
14:      try
15:          for product in Products do
16:              for version in product.getVersions do
17:                  for build in version.BuildFiles do
18:                      begin
19:                          if ChargeBuild( build, ChargeOptions ) then
20:                              builds.Add( build );
21:                      end;
22:
23:          LocalLibraryPresenter.Execute( CMD_ADDPRODUCTTOPACKAGE,
params );
24:
25:      finally
26:          params.Free;
27:          builds.Free;
28:      end;
29: end;
```

As shown, the ChargeProducts method creates an instance of AddBuildsToPackage class and fills it with the builds to be charged, according to the option passed in ChargeOptions parameter (which must specify the type of builds to include). With this structure filled in, the CMD_ADDPRODUCT-TOPACKAGE command is invoked on LocalLibraryPresenter to perform the actual charge operation (i.e., adding an entry in the local library and starting to download products from download locations). After all these function return, the CMDChargeProdcuts method checks to see if at least one download has been started and, if so, switches the view to "Downloads view" in order to track download progress. In the case that no download has started (i.e. none of the selected products are cached on the toolcloud), the ToolBox returns to its previous view (i.e., the list of products for the active toolcloud).

(4) Setup Product Licenses Logic

The logic for setting up licenses required to run an application from the ToolBox is encapsulated in a SetupLicenses function:

```
function SetupLicense(aProductBuildFile: TProductBuildFile; ToolCloud:
TToolCloud ): Boolean;
```

As shown, the function receives two parameters—a build file instance (aProductBuildFile) and an active toolcloud instance (ToolCloud)—and returns a Boolean to report success or failure. The build file instance contains a member that lists all locations on the local system where a license file must be present in order to run the respective application. This information is received with the other product details and metadata, when products are loaded from ToolCloud after a connection is established. These locations are in a canonical format in order to be compatible with various systems and setups, such as "appdata\Embarcadero" (which refers to Embarcadero Technologies' Application Data system directory).

For each entry in this list of locations, a call is made through WebServices in order to obtain (according to the previously configured access level) the licenses file to be copied locally. The call is performed using the previously described TToolCloudConnection class, by invoking a getAllAccessLicensesLocation method:

```
1: // class method
TToolCloudConnection.getAllAccessLicensesLocation(ToolCloud:
TToolCloud;
 2:                      var LicenseLocations:
productWebService_v10.ArrayOfString): Boolean;
 3: var
 4:      pws: productWebService_v10PortType;
 5:      login: string;
 6: begin
 7:      Result := false;
 8:      pws := GetproductWebService_v10PortType( True,
ToolCloud.getURLforWSDL );
```

```
9:
10:     if pws <> nil then
11:     begin
12:        LicenseLocations :=
pws.getAllAccessLicensesLocation(ToolCloud.SessionID);
13:        Result := True;
14:     end
15:     else
16:        TLog.GetInstance.Error( 'productWebService_v10PortType is nill' );
17: end;
```

The method creates internally an instance of productWebService_v10 and calls the getAllAccessLicensesLocation with the toolcloud SessionID as a parameter. The licenses locations obtained in return are in fact URLs within the toolcloud from which the ToolBox will download the license files to the local locations specified (above).

Exemplary Platform Enhancements

AppWave™ on-Demand Software Solution:

In accordance with the present technology, an on-demand software solution is provided. Specifically, Embarcadero AppWave™ (commercial embodiment) Platform and Store provides a source for applications ("Apps"), licenses, and templates that one can use to master and broadcast one's Apps. In one embodiment, the product browser of FIG. 1 is AppWave™.

Adding Packaging Analyst & Design Engine (PADE) Plugins and Instant Packaging to the AppWave™ Environment:

The following outlines how to provide instant packaging support for a given product through public servers. This support is added without users having to update the browser or studio.

Based on a product's Software License Agreement (SLA), one may not have permission to redistribute a given product to end users. Microsoft products, for example, typically fall into this category. Other products, like open source products or companies that allow distribution, can be redistributed in as an AppWave package. For those products that cannot be redistributed, the end user may rely on instant packaging. Once the product is packaged and placed in the user's AppWave Cloud, the user will not have to package it again. However the skill set required for adding the product to the Cloud must be limited to the ability to run the install.

Three file formats are used to add Applications and Instant Packaging support the AppWave and AppWave Browser:
 1. .ION is an InstantOn that can be run using the browser
 2. .PADE is a plugin used to help users package an application by automatically manipulating the file and registry entries in the virtual application
 3. .AW is an AppWave file that adds Instant Packaging support to a server and browser Instant Packaging Involves:
 1. Cataloging the product in the Studio, including branding and all the data that makes up the studio metadata file (TCA).
 2. The End User License Agreement (EULA) and Icons for the application.
 3. PADE plugins that modify captured studio metadata file (TCA) so that the product is portable and will run on other platforms.
 4. Prerequisites, including those things that are required by the product and are placed in the package so the package will run on systems without prerequisites.

All of this is downloaded in an .AW file to the studio based on demand.

Creating the Instant Packaging Artifact:

A new utility, the PADE Plugin Manager, is used to easily create the AppWave file (.AW) which is used to add Instant Packaging support to a server. The utility will also allow the user to choose which PADE plugins are required for Instant Packaging of the target application.

Usage is Straightforward:
 1. Open the ION for the product in the PADE product manager.
 2. Select the PADE plugins from the list of available plugins found on the system.
 3. Click Save to produce an AW file with the same name as the ION.

The PADE Product Manager is located in the directory as the TCACommandLine and the AppWaveBrowser executable.

Introducing Instant Packaging to the Cloud:

New command line options are provided to allow a user to deploy a PADE plugin and add Instant Packaging support to the cloud (private or public). The server also allows a user to import an AppWave file directly.

Each PADE Plugin:
 1. Is a zip file, the extension will be .pade
 2. Contains a Delphi package: pluginname.bpl
 3. Contains a text file version.dat that follows the java property file format
 VersionNum=<number>
 description=<a description>
 F# one entry for each file contained in the .PADE file
 Optionally include other files as required by the plugin (tca files, dependencies, etcs)

Deploying a plugin to the cloud:
 1. Requires package privileges on the specific host
 2. The host will verify that the plugin package contains the two required files
 3. Verify that the version.dat is correctly formatted
 4. The deploy will fail if the deployed plugin is the same or an older version of a plugin or if the plugin does not contain the two required files.

Adding Instant Packaging support to the cloud:
 1. All required PADE Plugins must be deployed to the cloud prior to deploying an application that requires them.
 2. Run the PADE Product Manager to set up the PADE dependencies and create the AW file.
 3. Deploy the AppWave file using the studio command line.

The cloud performs the following on a deploy:
 1. Verifies that all required PADE plugins are already on the server 2. Adds the following to the product catalog: Product Name, Product Executables, Vendor, Icon and Website The server only accepts new products if the user has packaging privileges.

Making Instant Packaging Support Available to Everyone:

Instant Packaging support for a product is made available by deploying the AW file and all required PADE plugins to either a private or public cloud. Users who have packaging privileges will be able to see all Instant Packaging products in the main browser window and in the Studio Start page Managing Instant Packaging in the Cloud:

The public cloud is modified to allow users with packaging privileges to upload PADE plugins, Instant Packaging and Redistributable applications. When a private cloud polls the public cloud to check for new products, new Studio supported product catalog information will always be retrieved. Retrieval of the AppWave file for a particular product along with specific PADE applications is done on demand. The private cloud will make use of the PADE plugin version numbers to determine if a new version must be downloaded. A user cannot delete an Instant Packaging Application from the private cloud although the administrator can change the visibility of all Instant Packaging and redistributable products Determining Instant Packaging Support in the Browser The product catalog will contain a Boolean field to indicate support. If a user does not have packaging privileges, the studio tab and all instant packaging applications should not be visible. The administrator can hide any application (Instant Packaging or redistributable) from a packager, invisible apps will not show up in the studio catalog or in the browser view. Only show a separate item for Instant Packaging support if no InstantOn for the application exists. The Studio has access to all Instant Packaging Applications.

Obtaining Instant Packaging Support from the Cloud

When a user elects to package an application, the Studio will:

1. Retrieve the AppWave file (includes brand, launch, required PADE plugins, EULA and Icons) from the cloud. This information will be used to automatically populate the product info
2. Ensure that the latest version of all required PADE plugins are available
3. If a PADE plugin is missing, Studio will download it.
4. If the plugin exists on the packaging computer, the versions will be compared to ensure the latest version is used All plugins must be retrieved prior to PADE analysis being run. If some plugins are missing, the user will be given the option to cancel the process or proceed knowing that custom steps will be required.

Creating an AppWave Template:

The following steps outline the packaging process required to create a valid InstantOn for an application and how to turn that into a template. It is a good practice to record the application on a clean machine. A clean machine is one where the application has never been installed. The best practice is to have a virtual machine with the OS still in its post installation state ('out of the box') and no applications installed.

1. Preparation

Preparation includes collecting brand info, install, pre-requisites, and guide info. For example, RedgGate require the .Net framework. The RedGate installer does not install .Net so the user will install it while recording. Other considerations at this point include:

1. How the product (application) works.
2. How is the product licensed?
3. What is the main executable?
4. What other pre-requisite does the product have? For example, Toad for Oracle requires the Oracle client in order to test the application works (it connects to an Oracle DB).
5. Whether the application needs to install and relies on drivers or services (and whether supported).
6. Internet search for guides on how to package the application for other Application Virtualization providers, such as Microsoft App-V or VMWare ThinApp.

Users employing virtual machines may capture to snapshot after pre-requisites have been installed so those users can return to the pre application install state. Upon completing the above preparation, the user should have InstantOn Guide started and most of the data filled in.

2. Recording and Testing

Using the AppWaveBrowser, the user selects the Studio tab and then (under "Build an InstantOn" page) chooses "Create AppWave Supported or Universal InstantOn from Install" option. The user then un-checks (deselects) "Apply Instant Packaging Rules" and selects installation. When the installation is done, the user clicks the Finished button of the recording window.

When recording, the following precautions are observed. If the installation offers multiple applications, one should choose only one application; e.g., Redgate has ten applications in one installer. Many installers ask the user at the end of installation to start the application, thus during recording the user should un-check this option to avoid capturing first launch configuration. Any option to Check for updates or automatically checks for updates should be turned off. Recording with the "All process" option instead of "Installer process and sub-processes only" will record all activity on the machine. Thus, the user should make sure he or she does not start applications that are not intended to be recorded. If installation requires a restart, the user should proceed with restart; after the restart, the AppWave Browser will start up and finish recording. Note that, on the restart, all processes are recorded which will result in any additional applications being captured.

When recording is finished, the user saves the project as a studio definition file (.tca file extension). It is preferable to back up this file so that the user can come back to the original capture before any modifications. There might be some alerts to fix tasks; these tasks will change the content of the application. It is ok to fix the tasks now, however later if the product is not running one may need to go back to the original studio file and carefully run tasks to make sure it doesn't remove something the application requires.

The studio includes the following pages:

1. Launch: choose the executable associated with the application.
2. Brand: fill in the details about the application: name, version, publisher, etc.
3. Instant On: Inspect the files, registries, environment variables that were captured as part of the install. Attempt to delete any registry or files that do not belong to the application.
4. Test: Set compression to "No Compression" for faster packaging. Prior to creating the final InstantOn, the compression should be set to Best Compression which will result in the longest package time however the smallest file size. Select package to begin packaging the application. At the end of the packaging process select the "Launch" button to start the application and determine if it is working.

5. Deploy: Clicking on the Deploy button will create the InstantOn and it will upload it to the AppWave. Once the application has been deployed the user can find it by switching to the Apps tab, refreshing and searching for the InstantOn just created (using the application name).

The user should initially package the application without making any changes. Then, the user may proceed with recording, packaging and testing other releases, for example, for Windows XP (32-bit), Win 7 (32-bit), and Win 7 (64-bit).

3. Troubleshooting

If problems are encountered, the user may take the following steps to trouble shoot. First, required drivers or services should be noted. The user should make sure all dependencies are present. This may require running some dependency analysis, both in the packaged app and outside the packaged app. The user should compare TCA from both platforms, often by including the differences in both the product will work. A good technique to find artifacts that are missing is unpacking the application onto the disk, try running it. The user can try packaging without applying any of the task fixes. If the application works then one of the tasks is causing a problem. Escalate this observation to management. Any customization work required to get the product to function should be noted and any record failures logged.

4. Create & Deploy Template

Using PADEProductManager found in the folder where AppWaveBrowser is installed (E.g., C:\Documents and Settings\Administrator\Local Settings\Application Data\Embarcadero\AppWaveBrowser). Import the InstantOn to see a list of PADE plug-ins and some of them are checked. If the application requires some a pre-requisites like .Net, J#, MSVC, etc. then one may manually select the related plug-ins (for example EMBTDotNet, EMBTJavaAppPlugin, EMBTMSVCPlugin). Saving this will produce an AppWave Template (.aw file extension) in the same directory as the InstantOn. This template can be imported in the AppWave Host.

The template is a zip archive. Open the archive to change the content. If template has a '?' icon then the icon was not set properly, within the metadata.xml file add the iconList tag the ico/png file. E.g. <iconList><icon size="10" path="scooter_beyond_compare_3.png"/> inside <productList>. Change the createdBy attribute to "Embarcadero" in the metadata.xml. Change the studio file (.tca) so that PackagedBy is set to "Embarcadero". Remove the ToolCloudUrl. In order to deploy the template on the server use the appwavec utility (in the folder where AppWaveBrowser was installed) with the −D parameter.

Using the AppWave Browser, connect to the AppWave host and search for the template deployed in the previous step. Launch the template to start recording the application. This time, the Studio pages Launch, Brand should already be completed with the right info and no Tasks should appear anymore. If the InstantOn created using the template is not working, one checks for differences between this InstantOn and an existing one that works.

5. License Automation

The user-directed process is as follows. Define type of license automation (serial or file). Create license.xml file that specifies where to place the license. Open PADEProductManager and go to the License Automation tab. Enter studio file and license.xml created and then click Merge. The license info is transferred into the studio file. Reopen the studio file in Studio and in the Test page, package and launch the application. A dialog appears asking for necessary items to license the application (and one can test that it works). Once this InstantOn is deployed, enter the same licensing info in the admin console of the AppWave. Launch the deployed InstantOn on a clean machine and test that the license automation is working properly and application does not ask for a license and simply runs.

6. Unit Tests

Build unit tests for testing the product. Run tests and verify product is working.

7. Upload Guide

Save and upload guide.

8. Upload License

Sample License.xml

```
 1: <?xml version="1.0" encoding="utf-8"?>
 2: <Application RepackageRequired="false" TcafileSchemaVersion="2">
 3:     <Commands/>
 4:     <EnvironmentVariables/>
 5:     <Files/>
 6:     <Eulas/>
 7:     <ProductAppearance>
 8:         <ScreenShots/>
 9:     </ProductAppearance>
10:     <Profile CreateNewPackage="false" PatchVersion="0"    Version="0"/>
11:     <Registry/>
12:     <Services/>
13:     <Triggers/>
14:     <LicenseAutomation>
15:         <ProductLicenseInfos/>
16:         <Licenses>
17:             <License Name="MindManager7" Description="MindManager7Id">
18:                 <Elements>
19:                     <Element Name="element1">
20:                         <Registry>
21:                             <RegistryRoot RegistryRootType="HKEY_LOCAL_MACHINE">
22:                                 <RegistryKey FirstAddedVersion="0" InstantOnType="Use InstantOn" LastDeletedVersion="−1" Name="SOFTWARE">
23:                                     <RegistryKey FirstAddedVersion="0" InstantOnType="Use InstantOn" LastDeletedVersion="−1" Name="Mindjet">
24:                                         <RegistryKey FirstAddedVersion="0" InstantOnType="Use InstantOn" LastDeletedVersion="−1" Name="MindManager">
```

```
25:                                        <RegistryKey FirstAddedVersion="0"
InstantOnType="Use InstantOn" LastDeletedVersion="-1" Name="7">
26:                                             <RegistryKey FirstAddedVersion="0"
InstantOnType="Use InstantOn" LastDeletedVersion="-1"
Name="Registration">
27:                                                 <Registry Value FirstAddedVersion="0"
LastDeletedVersion="-1" LastModifiedVersion="0" Name="LicenseKey"
RegistryValueType="REG_SZ" Value="?SerialId?"/>
28:                                             </RegistryKey>
29:                                         </RegistryKey>
30:                                     </RegistryKey>
31:                                 </RegistryKey>
32:                             </RegistryKey>
33:                         </RegistryRoot>
34:                     </Registry>
35:                     <LicensingApplications/>
36:                 </Element>
37:             </Elements>
38:             <Inputs>
39:                 <Input Name="SerialStringId" Id="SerialId" Type="String"
Required="true" DescriptionId="DescrSerialField"/>
40:             </Inputs>
41:         </License>
42:     </Licenses>
43:     <StringList>
44:         <Language Id="EN">
45:             <String Id="MindManager7Id">
46:                 <Value>Mind Manager 7</Value>
47:             </String>
48:             <String Id="SerialStringId">
49:                 <Value>Serial String Input</Value>
50:             </String>
51:             <String Id="DescrSerialField">
52:                 <Value>In order to license Mindmanager, perform the
following steps<ul><li>
53:                 In the window "Mindjet Mindmanager License" that appears at
startup press the "Enter Key License" button</li><li>In
the new "Enter License Key" window enter in the key
below:</li></ul></Value>
54:             </String>
55:         </Language>
56:     </StringList>
57:     </LicenseAutomation>
58: </Application>
```

Packaging Analyst & Design Engine (PADE)

The purpose of a Packaging Analyst & Design Engine (PADE) is to help correct problems frequently encountered when preparing an application for InstantOn. PADE allows for plug-ins to analyze the content of the package and recommend changes and potentially make changes. A single Plug-in should be able to support multiple resolutions.

Resolution Type

There are three types of resolution:

1. Suggestion, something has been identified as a potential issue but the fix is only a suggestion. A recommended fix may still be made but resolution should be granted by the user and the change should never be automatic.
2. Input Required, a problem has been identified, automatic resolution is not possible without input. Once the input is supplied the fix can be applied.
3. Known, problem is identified and a resolution is known. Resolution can be applied automatically (assuming user has granted automatic resolution).

Resolution Information

Each Resolution supplies:

1. Problem, short description of problem.
2. Resolution, short description of resolution.
3. Input Request, Input type plus short description of what data is required to perform input. This can be "none" for Plug-ins that do not require input.

Input Types

Input types should mirror registry types.

Traversal

Each PADE Plug-in hooks into the system by identifying what it wants to review. The main categories are launch file, files, registry and environment variables. For each category the plug-in can specify path & target. Wild cards are permitted when matching both path and target. Special files and folders can also be identified (example: Install Folder).

The following trigger point invoke the plug-in:

File added
Folder added
Launch file specified
Registry Key added
Registry Value added
Environment Variable added
After Record (or Parse)
AppEvent added After the traversal and detection the plug-in supplies resolutions. Though not ideal if the problem is known to be custom for a specific application, a plug-in can also optionally bind triggers to that applications. Once a plug-in is loaded for a particular application it should stay in memory for the duration of the package so that state can be maintained.

Detection Type

Detection Type identifies what additional data the PADE Plug-in requires in order to detect a potential problem.

Path only, means that no additional information other then the existence of the path is required.

Target only, means that no additional information other then the name of the target (file, value, etc) is required.

Target Content, means that the content of the target is needed. For instance supplying the content of a file. Supplying the content of the value.

Dependencies, this triggers an analyst of the file to get the dependency graph of all supporting DLLs it requires.

Resolution Interface

Resolution interface allows PADE Plug-in perform CRUD (Create, Read, Update, and Delete) for package meta-data.

Files, Folders
Registry Keys, Values
Environment Variables
Launch Command, Command Line, Working folder.
Branding
AppEvents When adding if the addition already exists then the operation can be ignored.

Optimizations

It is important that every plug-in does not load files. Allowing plug-ins to participate in a stream greatly reduces the amount of file I/O required. Since a plug-in has access to the meta-data it is possible for it to traverse the directory or key structure; however it should be obvious that they can participate in this traversal via the triggers. This should reduce the amount of time to analyze the package. The host system can be access by normal means.

License Automation

License Automation refers to provisioning a third party product with a license when running that product using the AppWave Browser. The license information can be any combination of strings and files, as dictated by the product requirements. The following describes how the various parts that make up the system have been affected by the license automation feature.

1. The AppWave Template

License automation information is contained in the App-Wave template. Specifically, the TCA file in the template contains a License Automation element that defines the licensing needs for the product. Note that this section can and will define the requirements for various versions of the product.

2. The InstantOn

When an application is packaged, the license information is copied from the template into the application's TCA file. At deploy time, the license automation information is processed and extracted into a license.xml file which is included in the InstantOn.

3. The AppWave Host

Provisioning a license on the host is easy to do. Prior to this step, one ensures that he or she has a valid license (or set of licenses) and permission to log onto the Admin portal of one's private Host. Then, the following user-directed steps are followed.

1. Log onto the host
2. Ensure the application has been deployed to the host
3. Click on License Automation on the left navigation panel
4. Select the application one would like to provision with a license
5. Click on Add Activation Value to add a single license, click on Import Activation Value to bulk import licenses. (Note that bulk import is only available if the required license is a single serial number or a single license file.)
6. Add the license information
7. Click on Save
8. Click on Finish 4. The AppWave Browser For the most part, the user should be completely unaware that any licensing is taking place with respect to license automation. There are two exceptions to this rule. The first is if any of the license requirements require user input such as a user name, email address or organization name. When this is the case, the user will be prompted to provide this information prior to launching the application. The second possibility is if license automation is not possible for a particular product but we are still provisioning the third party license. In this case, a dialog will display the license information (serials, license files) in a dialog so the user can manually enter the license information. In all cases, license provisioning takes place after the user has accepted the EULA, before the application has started. The browser will request a third party license from the Host. Any and all serial #'s, license files and required license automation handlers are retrieved. License automation is performed and the application is launched. If no licenses have been provisioned on the Host, this will be logged and the application will be started without any license automation.

Licensing Options

Due to the various ways that applications are licensed, the model to provide license automation is extremely generic and flexible. License automation provides the following 3 services to provision a license to an application. In all cases, the service can be executed on either the host computer or inside the application bubble. When the licensing service is performed inside the application bubble, it follows all the same rules that are applied when creating an App. Each section will be discussed in detail later in the document.

1. Displaying the license information to the user in a dialog
2. Registry key and value creation\modification
3. File and folder creation\modification
4. Launching an application Specifying License Information for a Product License information for a product is specified in the license.xml file. Note that case the file name is case sensitive as are all attributes and elements in it. The license.xml file has the same format as a TCA file. Only the LicenseAutomation element is important with regards to license automation and it contains three main sections:

The LicenseAutomation Element:

<LicenseAutomation>
    <ProductLicenseInfos> <!-- Contains license information for Embarcadero products, product id, SKUs, SLIP_Location per version of the product -->
    <Licenses><!-- Contains the various ways that this product can be licensed, has a series of <License> elements -->

```
    <StringList><!-- contains a list of strings, categorized by language, to
display to the user either in the Host for the license provisioner or in the
browser -->
</LicenseAutomation>
```

The License Element

The license element introduces the following.

Element node: elements are executed sequentially, each element contains a Files, Registry and LicensingApplication node. The order of execution for these nodes is not guaranteed or defined. If order is important, create multiple Element nodes. The Element Name identifies the element. It is not referenced anywhere else or used.

Files node: This describes the file structure that must be created by the license automation framework. It is the exact same format as that of a TCA file so it is recommended that one use the studio to create the required nodes and copy them into the appropriate section of the license.xml file. The Name and OriginalFile attributes are used to determine source file and destination file name The InstantOnType attribute determines if the real or virtual file system will be used. For virtual, ensure the InstantOnType value of all nodes is "Use InstantOn".

Registry node: This describes the registry structure that must be created by the license automation framework. It is the exact same format as that of a TCA file, so it is recommended that one use the studio to create the required nodes and copy them into the appropriate section of the license.xml file. The Name or Value (for a key) can be set dynamically by license automation inputs. The InstantOnType attribute determines if the real or virtual registry will be used. For virtual, ensure InstantOnType the value of all nodes is "Use InstantOn".

LicensingApplicaton node: This describes the application that must be run by the license automation framework. This node must be created by hand as no equivalent exists elsewhere in the TCA file. The application can exist on either the real computer, inside the bubble or as a Handler (making use of the PADE Plugin framework) on the AppWave Host.

Input element: This describes all the inputs needed to provision a license for the application The input element describes:

- the input name—this is the link to the string id in the string table
- the input id—this references how the input is used in either the Registry, File or LicensingApplication element above
- the input type (File or String)
- is it required (true, false)
- the input description—the descriptionid to the string table of what the input is used for and how (in the display dialog when automatic provisioning cannot be performed).
- is user specific (true, false)—if true, this input will not be provisioned on the host, instead the user will be prompted to provide the information at run time.

Example

```
License Name="AraxisMerge7" Description="AraxisMerge7Id">
    <Elements>
        <Element Name="element1">
            <Files/>
            <Registry/>
            <LicensingApplications/>
        </Element>
    </Elements>
    <Inputs>
        <Input Name="SerialStringId" Id="SerialId" Type="String" Required="true" DescriptionId="DescrSerialField" IsUserSpecific="false"/>
        <Input Name="UserStringId" Id="Name" Type="String" Required="true" DescriptionId="DescrUserField" IsUserSpecific="true"/>
        <Input Name="FileStringId" Id="FileId" Type="File" Required="true" DescriptionId="DescrFileField" IsUserSpecific="false"/>
    </Inputs>
</License>
```

Special ID's

Certain input ID's that get special treatment in the license.xml.

1. Pre-Processing:

If ?InstallDir? is referenced in a place when license automation interprets a value, this value will be replaced with the actual installation directory (as referenced by the launch file) of the application. The value is preprocessed prior to deploying the app.

2. Special Variables/Environment Variables:

%cd%
%appdata%
%commonprogramfiles%
%mydocs%
%programfiles%
%systemroot%
%windir%
%sysdir%
%home%

Virtual Folders (Templatized Names):

Folders are referenced by surrounding "?", for example: ?ProgramFilesX86?

Server Supported Variables:

The server supports the following variables such that if the server contains the information in the users profile, this information will be automatically supplied to the system and the user will not have to fill it in. Note that as of the time of writing this document, the server has created the web service to retrieve this information but it has not yet been integrated into the browser.

?Name?
?Organization?
?EmailAddress?

The StringList Element:

The StringList element contains all text that is displayed to the user. This text is used by the AppWave Host when an administrator is provisioning a license, used by the Studio when a user Launch an application from the test page and by the Browser when a user is required to enter user information or license automation cannot be performed. The String id references either the Name in an Input element, the Descriptionid in an Input element or the Description attribute in a License element.

```
<StringList>
    <Language Id="EN">
        <String Id="AraxisMerge7Id">
            <Value>License Araxis Merge 7</Value>
        </String>
        <String Id="SerialStringId">
            <Value>Enter the serial number to license the product</Value>
        </String>
    </Language>
    <Language Id="FR">
        <String Id="AraxisMerge7Id">
            <Value>French License Araxis Merge 7</Value>
        </String>
        <String Id="SerialStringId">
            <Value>French Enter the serial number to license the product</Value>
        </String>
    </Language>
</StringList>
```

Sample Registry License

In the following example, a series of registry keys will be created in the virtual bubble. Under the 7.0 registry key, four registry values will be created. Looking at the input elements, note that certain inputs are user specified. This means that the user will be prompted to enter String values for Name, Organization and EmailAddress prior to having the keys created and the app launched.

```
<License Name="AraxisMerge7" Description="AraxisMerge7Id">
    <Elements>
        <Element Name="element1">
            <Registry>
                <RegistryRootRegistryRootType="HKEY_CURRENT_USER">
                    <RegistryKey FirstAddedVersion="0" InstantOnType="Use InstantOn" LastDeletedVersion="-1" Name="Software">
                        <RegistryKey FirstAddedVersion="0" InstantOnType="Use InstantOn" LastDeletedVersion="-1" Name="Araxis">
                            <RegistryKey FirstAddedVersion="0" InstantOnType="Use InstantOn" LastDeletedVersion="-1" Name="Merge">
                                <RegistryKey FirstAddedVersion="0" InstantOnType="Use InstantOn" LastDeletedVersion="-1" Name="7.0">
                                    <RegistryValue FirstAddedVersion="0" LastDeletedVersion="-1" LastModifiedVersion="0" Name="LicensedUser" RegistryValueType="REG_SZ" Value="?Name?"/>
                                    <RegistryValue FirstAddedVersion="0" LastDeletedVersion="-1" LastModifiedVersion="0" Name="SerialNumber" RegistryValueType="REG_SZ" Value="?SerialId?"/>
                                    <RegistryValue FirstAddedVersion="0" LastDeletedVersion="-1" LastModifiedVersion="0" Name="CompanyName" RegistryValueType="REG_SZ" Value="?Organization?"/>
                                    <RegistryValue FirstAddedVersion="0" LastDeletedVersion="-1" LastModifiedVersion="0" Name="EmailAddress" RegistryValueType="REG_SZ" Value="?EmailAddress?"/>
                                </RegistryKey>
                            </RegistryKey>
                        </RegistryKey>
                    </RegistryKey>
                </RegistryRoot>
            </Registry>
            <LicensingApplications/>
        </Element>
    </Elements>
```

```
    <Inputs>
        <Input Name="SerialStringId" Id="SerialId" Type="String" Required="true"
DescriptionId="DescrSerialField"/>
        <Input Name="UserStringId" Id="Name" Type="String" Required="true"
DescriptionId="DescrUserField" IsUserSpecific="true"/>
        <Input Name="CompanyStringId" Id="Organization" Type="String"
Required="true" DescriptionId="DescrCompanyField" IsUserSpecific="true"/>
        <Input Name="EmailStringId" Id="EmailAddress" Type="String"
Required="true"
DescriptionId="DescrEmailField" IsUserSpecific="true"/>
    </Inputs>
</License>
```

Sample File License

The following sample file assumes that the app (Beyond Compare) is licensed using a file. The file will be saved in the Beyond Compare 3 folder.

we should wait for that amount of time (in ms) prior to launching the main app. If the licensing application finishes, the return value will be compared and logged. The application will be launched inside the bubble

```
    <License Name="Beyond Compare 3"
Description="BeyondCompare3licensingID">
        <Elements>
            <Element Name="element1">
                <Files>
                    <FolderRoot InstantOnType="Use InstantOn" IsInstallFolder="false"
RootFolderType="%appdata%">
                        <Folder FirstAddedVersion="0" Hidden="false" InstantOnType="Use
InstantOn" LastDeletedVersion="-1" Name="Scooter Software" ReadOnly="false"
Unpack="false">
                            <Folder FirstAddedVersion="0" Hidden="false" InstantOnType="Use
InstantOn" LastDeletedVersion="-1" Name="Beyond Compare 3"
ReadOnly="false"
Unpack="false">
                                <File FileSize="0" FirstAddedVersion="0" Hidden="false"
InstantOnType="Use InstantOn" LastDeletedVersion="-1"
LastModifiedVersion="0"
Name="?ByCompId08?" NoCache="false" OriginalFile="?ByCompId08?"
Prefetch1="false" Prefetch2="false" PreventCopying="false"
PrevVersionIndex="0"
ReadOnly="false" Unpack="false"/>
                            </Folder>
                        </Folder>
                    </FolderRoot>
                </Files>
                <Registry/>
                <LicensingApplications/>
            </Element>
        </Elements>
        <Inputs>
            <Input Name="FileStringId08" Id="ByCompId08" Type="File" Required="true"
DescriptionId="DescrSerialField"/>
        </Inputs>
    </License>
```

Sample Application License

The licensing application is packaged as a handler (PADE plug-in) and will be downloaded on demand by the browser. In this example, the licensing application is downloaded from the server, and the executable HelloWorld.exe (which will be located in the plugin folder under HelloWorldHandler) is executed. The application will be visible to the user (HideApp="false"), the main application will not be launched until the licensing application is closed (Timeout=0). If we wanted to run both concurrently, the timeout value could be set to -1 or a positive value indicating that (InstantOnType="Use InstantOn") and a single parameter (type is a string) will be passed to the licensing application. Prior to testing this use case, ensure that the handler is up on the server one is connected to. The handler can be deployed using the AppWavec.exe-d-pade command or uploaded using Version Updates\Manually upload an application. Note that if we wanted to execute an application that is part of the package (or on the host computer), remove the Handler field, specify the templatized path and the executable name in the Path attribute.

```
    <License Name="Office2010" Description="Office2010Id">
        <Elements>
            <Element Name="element1">
                <LicensingApplications>
```

```
            <LicensingApplication Path="HelloWorld.exe" Arg="?Param1Id?"
InstantOnType="Use InstantOn" Timeout="0" ValidResult="0"
HandlerName="HelloWorldhandler" HideApp="false"/>
        </LicensingApplications>
      </Element>
    </Elements>
    <Inputs>
        <Input Id="Param1Id" Name="Param1Id" Type="String" Required="True"
IsUserSpecific="false"/>
    </Inputs>
</License>
```

AppWave "app" URL

The "app" URL is used to determine the location of the application reference. By supplying a URL, one ultimately can load the application and determine reviews, description, icon, and the like.

1. Application URL Structure

A URL is used to resolve the application so that launch, details, reviews, studio, and the like for a specific application can be accessed or performed. Key attributes make up a specific URL or a floating URL. In order of priority, URL attributes include: application name, language, version, license, license type, edition, and launch type.

A URL holds the following basic structure:

```
app:// application name>/ [<language>/[<version>/[<license>/[<license
type>/[<edition>/[<launch type>]]]]]]
(Application name must be supplied.)
```

Language, version, license, license type, edition, and launch type are attributes used to uniquely identify the application. However each is optional. The priority is used to resolve conflicts. For instance app://myapp/1.0 would first try to resolve a language of 1.0, if it is not found the version would be tried, then edition, and so forth. A specific attribute can be skipped by leaving it blank, for instance app://myapp//1.0 would start the search at version and language would be ignored. Launch type indicates installed, installer or InstantOn.

2. Resolving an Incomplete Application URL

An incomplete (or floating) URL may be used to resolve the application for purposes of an action such as launch (e.g., launching a bookmark). Each attribute is associated with a default that is used determine the best choice if more than one options exist for that attribute. For example:

Language: current OS language, alphabetical
Version: latest
License: best AA then best product
License Type: workstation, named, concurrent
Edition: Most features
Launch Type: Installed, InstantOn, Install The parent attribute can shorted the list of possible options.

3. Search URL Structure

The search URL may resemble a commonly-used search URL, such as a Google or Chrome search URL. The URL which is used to trigger the search is derived by using the keyword "search".

app://search?attribute=value[&attribute=value]

Since "search" is a keyword, it should not be used in application name, folder, edition, and the like. Using the attribute "all" triggers a search across all attributes of an application (including folder name). The search can be refined by placing it an Application URL or Bookmark URL. For instance, app://My Folder/search?all=myapp would only search within the folder "My Folder" for references to "myapp". Or app://myapp//1.0/search?all=pro would only search the application myapp version 1.0 for references to the word "pro".

4. Other URL Commands

Though not obvious to the user, the follow URL commands are provided in addition to search.

Launch:

app://launch?url=[<application url>|<bookmark url>]

The "launch" keyword triggers an action to launch the application (resolved by the supplied URL).

Studio:

app://studio?url=[<application url>|<bookmark url>]

The "studio" keyword triggers an action to open the applications TCA (resolved by the supplied URL in the studio).

Detail:

app://detail?url=[<application url>|<bookmark url>]

The "detail" keyword triggers an action to open the applications details (resolved by the supplied URL in the browser).

Reviews:

app://reviews?url=[<application url>|<bookmark url>]

The "reviews" keyword triggers an action to open the applications reviews and ratings resolved by the supplied URL in the browser.

5. Incorrect URL

If a URL that does not match an application, bookmark, folder, or the like, the browser view indicates that the URL was not found and updates the address bar with the attempted URL.

Attached herewith is the aforementioned Computer Program Listing Appendix, which includes source code providing further description of the present technology. The source code, which is in Object Pascal format, may be compiled using publicly available compilers (including, e.g., Embarcadero® Delphi®, available from Embarcadero Technologies, Inc. of San Francisco, Calif.).

Operations

Figure 8:
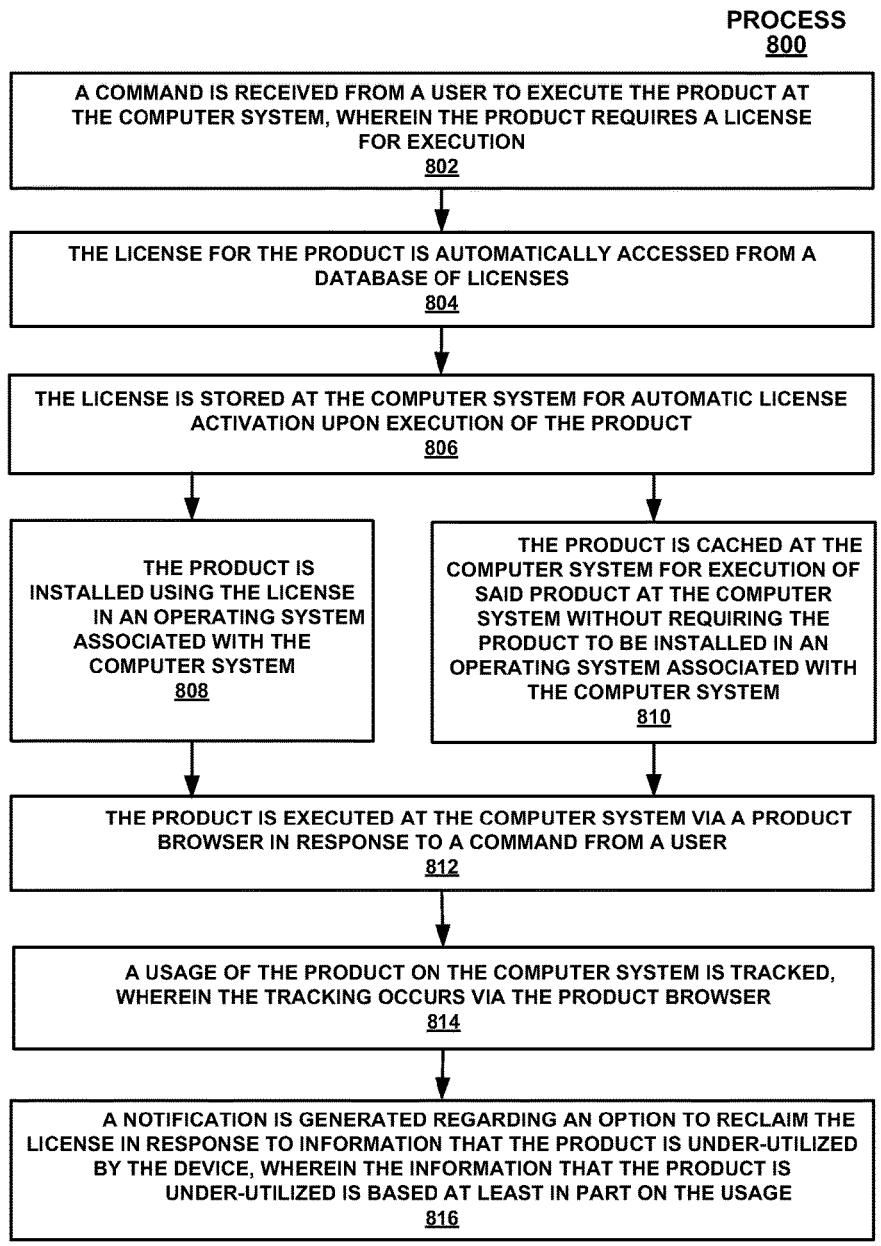
FIG. 8 illustrates a flowchart of an example method for managing a license for a product in accordance with embodiments of the present technology.

FIG. 8 is a flowchart illustrating process 800 for managing a license for a product, in accordance with one embodiment of the present invention. In one embodiment, process 800 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 800 is performed by devices and components in FIGS. 1 and 2A-2C.

At 802, a command is received from a user to execute the product at the computer system, wherein the product requires a license for execution. In one embodiment, the product is a self-contained file resolvable by a product browser.

At 804, the license for the product is automatically accessed from a database of licenses.

At 806, the license is stored at the computer system for automatic license activation upon execution of the product.

At 808, the product is installed using the license in an operating system associated with the computer system.

At 810, the product is cached at the computer system for execution of said product at the computer system without requiring the product to be installed in an operating system associated with the computer system.

At 812, the product is executed at the computer system via a product browser in response to a command from a user.

At 814, a usage of the product on the computer system is tracked, wherein the tracking occurs via the product browser.

At 816, a notification is generated regarding an option to reclaim the license in response to information that the product is under-utilized by the device, wherein the information that the product is under-utilized is based at least in part on the usage.

Figure 9:
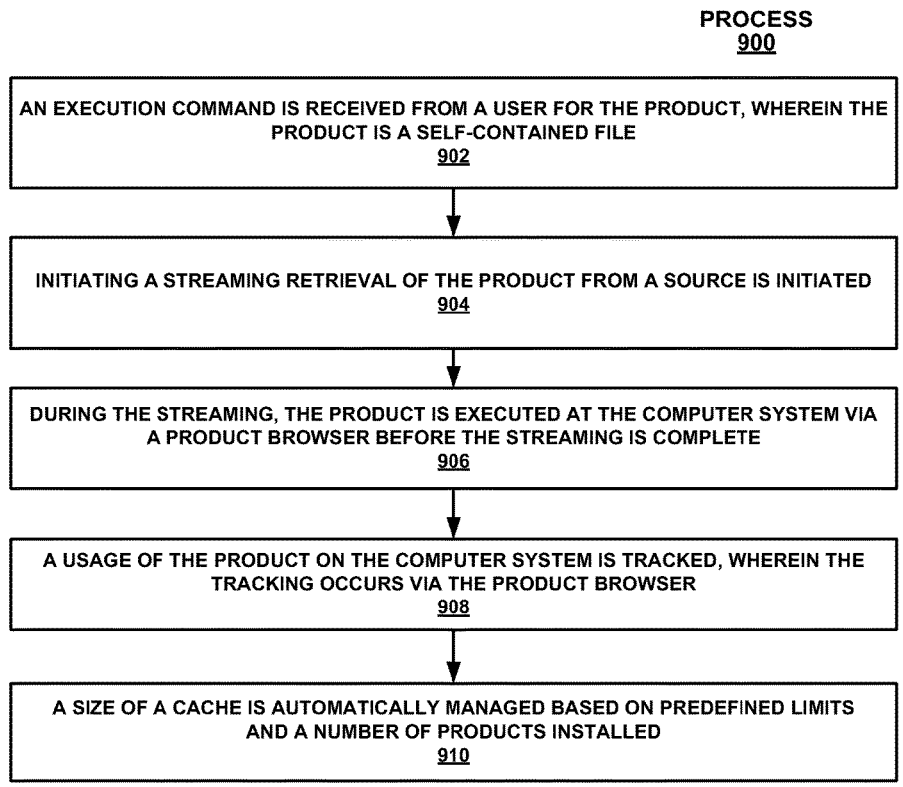
FIG. 9 illustrates a flowchart of an example method for executing a product on a computer system in accordance with embodiments of the present technology.

FIG. 9 is a flowchart illustrating process 900 for executing a product on a computer system, in accordance with one embodiment of the present invention. In one embodiment, process 900 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 900 is performed by devices and components in FIGS. 1 and 2A-2C.

At 902, an execution command is received from a user for the product, wherein the product is a self-contained file.

At 904, initiating a streaming retrieval of the product from a source is initiated. In one embodiment, the streaming retrieval of the product first pre-fetches core elements of the product needed for the executing. In one embodiment, the streaming retrieval of the product makes a demand for elements of the product needed for the executing.

At 906, during the streaming, the product is executed at the computer system via a product browser before the streaming is complete. In one embodiment, the executing the product caches the product at the computer system without requiring the product to be installed in an operating system associated with the computer system.

At 908, a usage of the product on the computer system is tracked, wherein the tracking occurs via the product browser.

At 910, a size of a cache is automatically managed based on predefined limits and a number of products installed.

Figure 10:
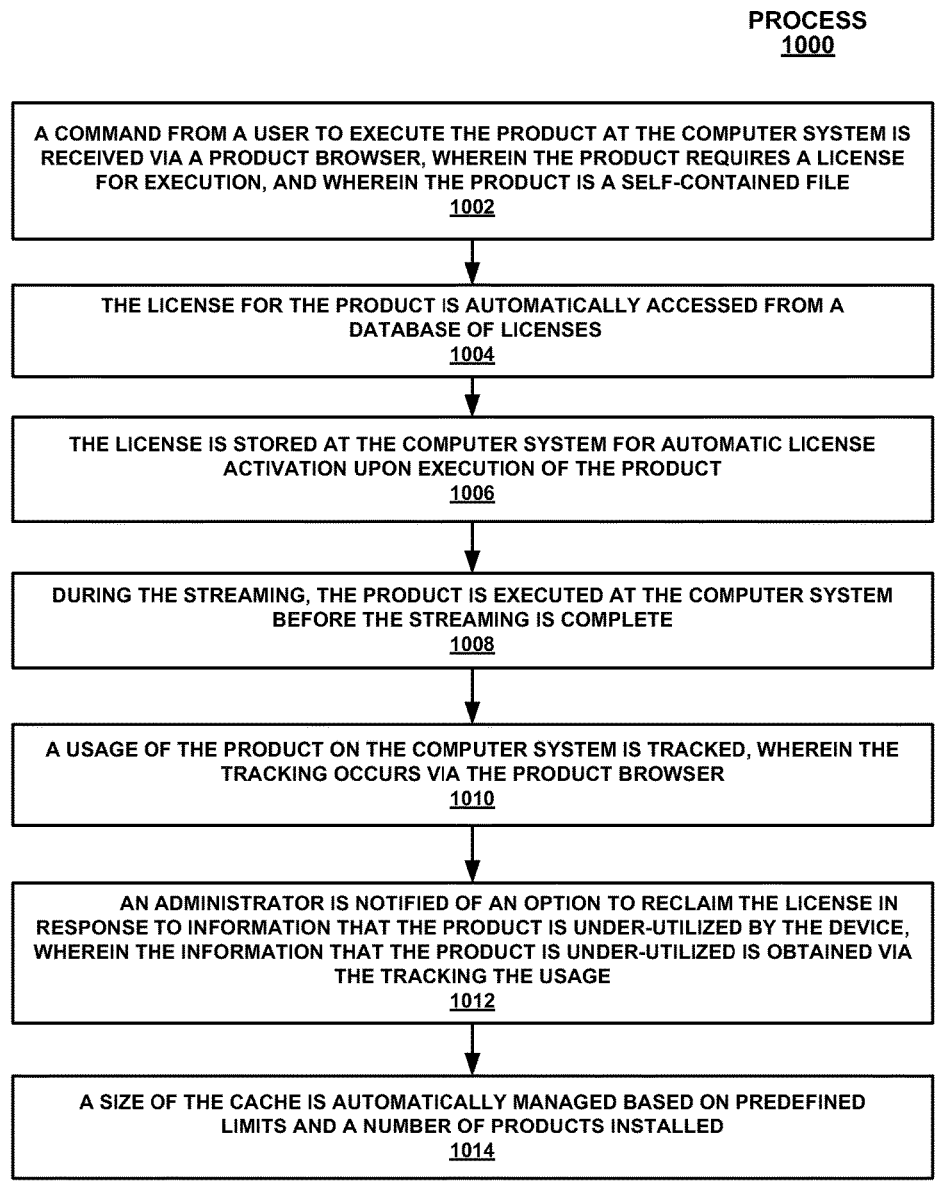
FIG. 10 illustrates a flowchart of an example method for managing and executing a product in accordance with embodiments of the present technology.

FIG. 10 is a flowchart illustrating process 1000 for managing and executing a product, in accordance with one embodiment of the present invention. In one embodiment, process 1000 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 1000 is performed by devices and components in FIGS. 1 and 2A-2C.

At 1002, a command from a user to execute the product at the computer system is received via a product browser, wherein the product requires a license for execution, and wherein the product is a self-contained file.

At 1004, the license for the product is automatically accessed from a database of licenses.

At 1006, the license is stored at the computer system for automatic license activation upon execution of the product.

At 1008, during the streaming, the product is executed at the computer system before the streaming is complete.

At 1010, a usage of the product on the computer system is tracked, wherein the tracking occurs via the product browser.

At 1012, an administrator is notified of an option to reclaim the license in response to information that the product is under-utilized by the device, wherein the information that the product is under-utilized is obtained via the tracking the usage.

At 1014, a size of the cache is automatically managed based on predefined limits and a number of products installed.

Figure 11:
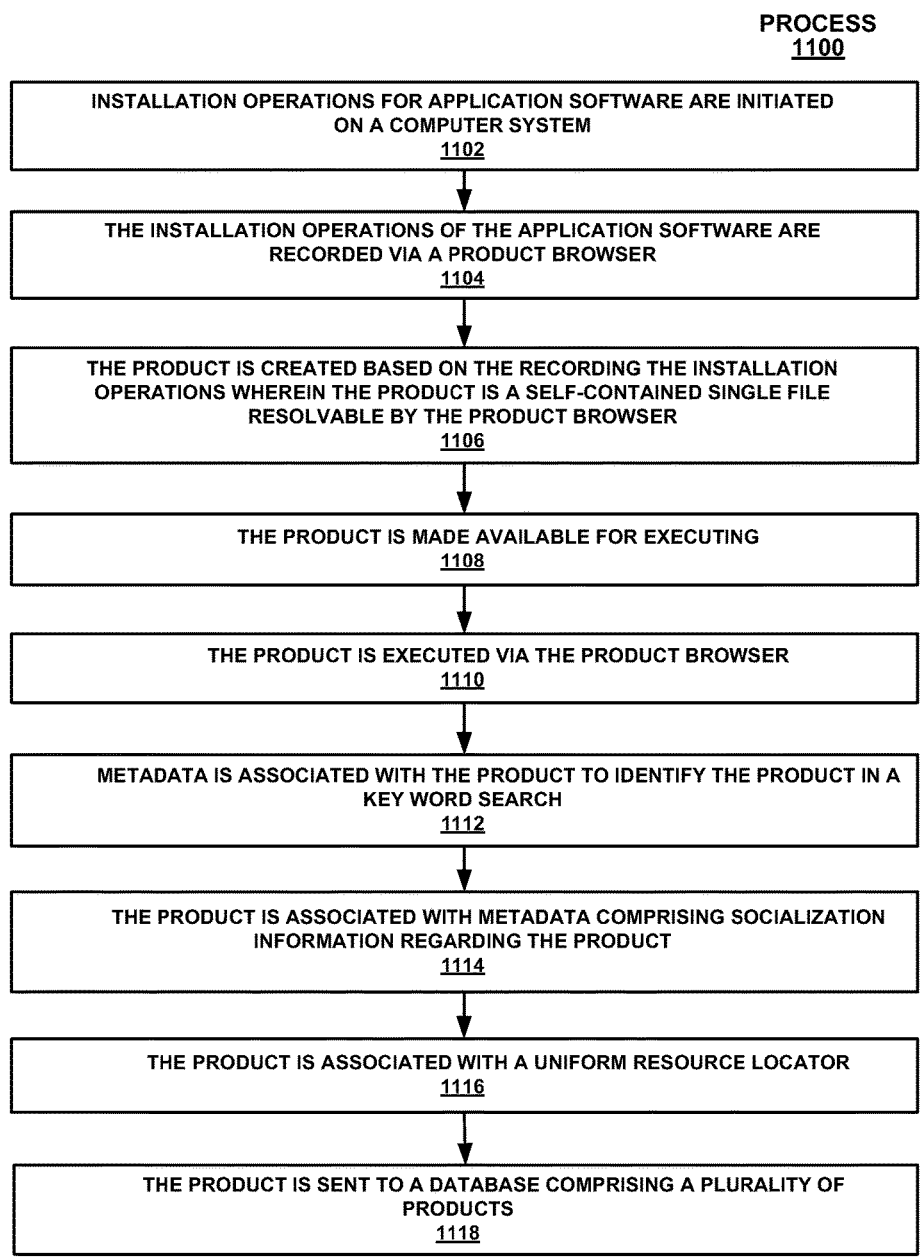
FIG. 11 illustrates a flowchart of an example method for creating a product in accordance with embodiments of the present technology.

FIG. 11 is a flowchart illustrating process 1100 for creating a product, in accordance with one embodiment of the present invention. In one embodiment, process 1100 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 1100 is performed by devices and components in FIGS. 1 and 2A-2C.

At 1102, installation operations for application software are initiated on a computer system.

At 1104, the installation operations of the application software are recorded via a product browser.

At 1106, the product is created based on the recording the installation operations wherein the product is a self-contained single file resolvable by the product browser. In one embodiment, the creating the product operates such that a license is stored in a medium for automatic use by the product browser upon executing the product without requiring input from a user.

At 1108, the product is made available for executing.

At 1110, the product is executed via the product browser.

At 1112, metadata is associated with the product to identify the product in a key word search.

At 1114, the product is associated with metadata comprising socialization information regarding the product.

At 1116, the product is associated with a uniform resource locator. At 1118 the product is sent to a database comprising a plurality of products.

Figure 12:
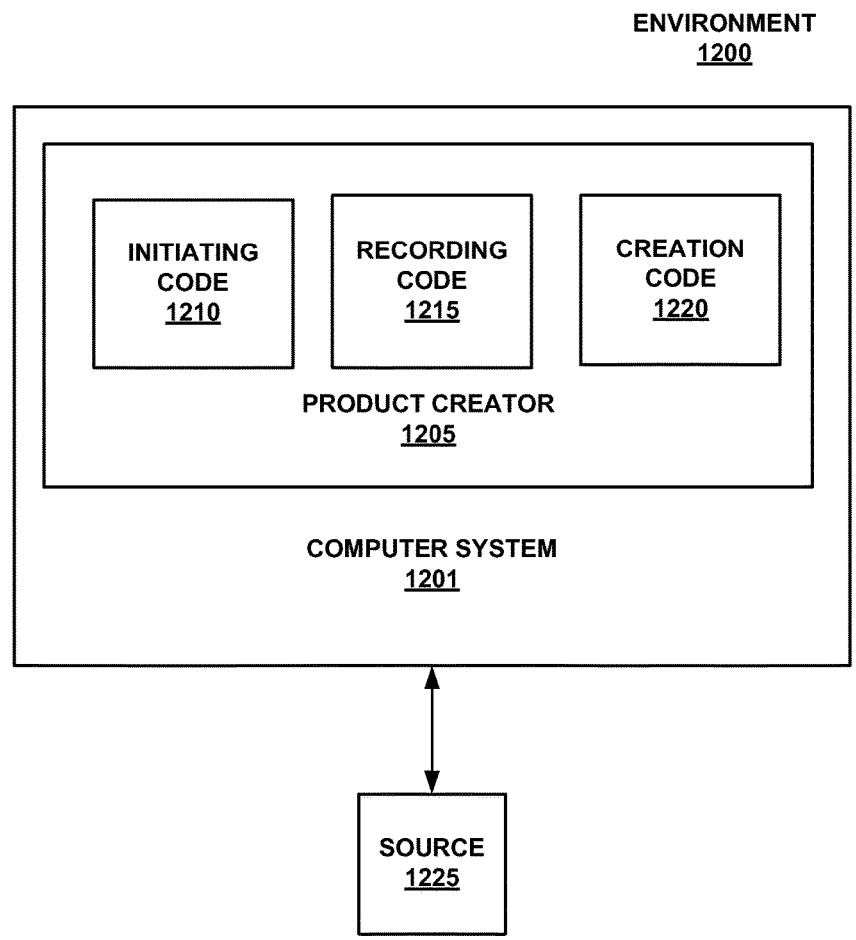
FIG. 12 is a block diagram of a product creator in accordance with embodiments of the present technology.

FIG. 12 is a block diagram illustrating environment 1200 which is an example environment comprising computer system 1201 and product creator 1205 in accordance with embodiments of the present technology. Environment 1200 depicts computer system 101 as a hardware computer system for carrying out the present technology. Product creator 1205 is depicted as comprising various components that may or may not be implemented in an embodiment of the present technology.

In one embodiment, product creator 1205 has the same features and capabilities of product browser 105 of FIG. 1. Product creator 1205 can also be ToolBox, Tool Cloud Application Wizard, AppWave, or AppWave Browser.

Initiating code 1210 operates to initiate installation operations for application software on computer system 1201. Recording code 1215 operates to record the installation operations of the application software via a product browser. Creation code 1220 operates to create the product based on the recording said installation operations wherein the product is a self-contained single file resolvable by the product browser. In one embodiment, creation code 1220 operates to identify files associated with installation operations for a software application at a computer system and to compile the files into a self-contained file to create the product for execution via a product browser. Creation code 1220 can also associate the product with metadata such as descriptions, support contacts, screenshots, icons, version, edition, web site, system requirements, release date, language type, socialization data, user ratings and reviews, etc.

In one embodiment, creation code 1220 associates the product with a uniform resource locator unique to the product. In one embodiment, creation code 1220 associates the product with a license such that the product can be executed automatically using the license without requiring input regarding the license from a user.

In one embodiment, product creator 1205 operates to make the product available for executing by a computer system other than computer system 1201. For example, the product may be sent to source 1225. Source 1225 may be a database, either public or private, for storing and making products available to product browsers. Such sending may occur using standard means for sending electronic data.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

What is claimed:

1. A non-transitory computer-usable storage medium having instructions embodied therein that when executed cause a computer system to perform a method for creating a product, said method comprising:

initiating installation operations for application software on a computer system;

recording said installation operations of said application software via a product browser, wherein said product browser is configured to create said product and execute said product;

creating said product based on said recording said installation operations wherein said product is a self-contained single file of said software application resolvable by a second instance of said product browser executing said software application at a second computer system such that said product is for execution via said second instance of said product browser, wherein said creating structures said product with critical dynamic-link library (dll) files that will be pre-fetched by said second instance of said product browser before other components of said product such that said product will be executed at said second instance of said product browser before rest of said product is downloaded, and wherein said product is structured with a virtualized private registry to be integrated with an operating system registry upon execution at said second instance of said product browser such that certain registry keys are virtualized in said virtualized private registry and other registry keys will be deferred to said operating system registry such that application binaries of said product execute natively on an operating system associated with said second computer system without virtualization where said virtual registry is employed only if a particular registry key is virtualized while other calls are passed through to said operating system; and storing said product to a database accessible by said second instance of said product browser, such that said product is discoverable via a user input at a user interface of said second instance of said product browser.

2. The method of claim 1, further comprising:
executing said product via said product browser.

3. The method of claim 1, further comprising:
saving metadata associated with said product to identify said product in a key word search.

4. The method of claim 1, further comprising:
saving metadata associated with said product wherein said metadata comprises socialization information regarding said product.

5. The method of claim 1, further comprising:
associating said product with a uniform resource locator.

6. The method of claim 1, wherein said database comprises a plurality of products.

7. The method of claim 1, wherein said creating said product operates such that a license is stored in a medium for automatic use by said product browser upon executing said product without requiring input from a user.

8. The method of claim 1, further comprising:
receiving a command to execute said product at said second instance of said product browser at said second computer system, wherein said product requires a license for execution;

automatically accessing a second database comprising licenses associated with an enterprise, wherein said license is one of a limited number of licenses owned by said enterprise for said product; and storing said license via said second instance of said product browser at said second computer system for automatic license activation upon execution of said product.

9. The method of claim 8, further comprising:
tracking a real-time usage of said product during execution at said second instance of said product browser; and generating a notification of an option to reclaim said license in response to information, wherein said information is based at least in part on said tracking said real-time usage.

10. A non-transitory computer-usable storage medium having instructions embodied therein that when executed cause a computer system to perform a method for creating a product, said method comprising:

identifying, at a product browser of a first computer system, files associated with installation operations for a software application;

compiling, at said product browser, said files into a self-contained file of said software application to create said product for execution via a second instance of said product browser executing said software application at a second computer system, wherein said product browser is configured to create said product and execute said product, wherein said product is structured with critical dynamic-link library (dll) files that will be pre-fetched by said second instance of said product browser before other components of said product such that said product will be executed at said second instance of said product browser before rest of said product is downloaded, and wherein said product is structured with a virtualized private registry to be integrated with an operating system registry upon execution at said second instance of said product browser such that certain registry keys are virtualized in said virtualized private registry and other registry keys will be deferred to said operating system registry such that application binaries of said product execute natively on an operating system associated with said second computer system without virtualization where said virtual registry is employed only if a particular registry key is virtualized while other calls are passed through to said operating system; and storing said product to a database accessible by a second instance of said product browser at said second computer system, such that said product is discoverable via a user input at a user interface of said second instance of said product browser.

11. The computer-usable storage medium of claim 10, said method further comprising:
executing said product via said product browser.

12. The computer-usable storage medium of claim 10, said method further comprising:
saving metadata associated with said product to identify said product in a key word search.

13. The computer-usable storage medium of claim 10, said method further comprising:
saving metadata associated metadata with said product wherein said metadata comprises socialization information regarding said product.

14. The computer-usable storage medium of claim 10, said method further comprising:
associating said product with a uniform resource locator.

15. The computer-usable storage medium of claim 10, wherein said database comprises a plurality of products.

16. The computer-usable storage medium of claim 10, wherein said product is created such that a license is stored in a medium for automatic use by said product browser upon executing said product without requiring input from a user.

17. A non-transitory computer-usable storage medium having computer readable program code embedded therein for a product creator, the program code comprising:

initiating code for initiating installation operations for application software on a computer system;

recording code for recording said installation operations of said application software via a product browser, wherein said product browser is configured to create said product and execute said product;

creation code for creating said product based on said recording said installation operations wherein said product is a self-contained single of said software application file resolvable by a second instance of said product browser executing said software application at a second computer system such that said product is for execution via said second instance of said product browser, wherein said creation code structures said product with critical dynamic-link library (dll) files that will be pre-fetched by said second instance of said product browser before other components of said product such that said product will be executed at said second instance of said product browser before rest of said product is downloaded, and wherein said product is structured with a virtualized private registry to be integrated with an operating system registry upon execution at said second instance of said product browser such that certain registry keys are virtualized in said virtualized private registry and other registry keys will be deferred to said operating system registry such that application binaries of said product execute natively on an operating system associated with said second computer system without virtualization where said virtual registry is employed only if a particular registry key is virtualized while other calls are passed through to said operating system; and storing code for storing said product to a database accessible by said second instance of said product browser, such that said product is discoverable via a user input at a user interface of said second instance of said product browser.

18. The computer-usable storage medium of claim 17, wherein said creation code is further for executing via said product browser.

19. The computer-usable storage medium of claim 17, wherein said creation code is further for saving metadata associated with said product to identify said product in a key word search.

20. The computer-usable storage medium of claim 17, wherein said database comprises a plurality of products.

* * * * *